(12) United States Patent
Futagi et al.

(10) Patent No.: US 9,660,750 B2
(45) Date of Patent: *May 23, 2017

(54) RADIO COMMNICATION DEVICE AND RESPONSE SIGNAL DIFFUSION METHOD

(71) Applicant: Optis Wireless Technology, LLC, Plano, TX (US)

(72) Inventors: Sadaki Futagi, Ishikawa (JP); Seigo Nakao, Osaka (JP); Daichi Imamura, Kanagawa (JP)

(73) Assignee: Optis Wireless Technology, LLC, Plano, TX (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/595,650

(22) Filed: Jan. 13, 2015

(65) Prior Publication Data

US 2015/0131610 A1     May 14, 2015

Related U.S. Application Data

(63) Continuation of application No. 13/860,398, filed on Apr. 10, 2013, now Pat. No. 8,958,384, which is a (Continued)

(30) Foreign Application Priority Data

Aug. 13, 2007    (JP) ................................ 2007-211102

(51) Int. Cl.
    *H04J 13/10*       (2011.01)
    *H04L 1/16*        (2006.01)
    (Continued)

(52) U.S. Cl.
    CPC .......... *H04J 13/102* (2013.01); *H04B 1/7103* (2013.01); *H04J 13/0074* (2013.01);
    (Continued)

(58) Field of Classification Search
    CPC ... H04L 5/0053; H04L 5/0007; H04L 5/0055; H04L 5/0057; H04L 1/0026
    See application file for complete search history.

(56) References Cited

U.S. PATENT DOCUMENTS 6,028,851 A     2/2000    Persson et al.
8,169,950 B2    5/2012    Shen et al.
(Continued)

FOREIGN PATENT DOCUMENTS

CN           1303193 A      7/2001
CN           1830161 A      9/2006
(Continued)

OTHER PUBLICATIONS

English translation of Chinese Search Report mailed Mar. 24, 2015 in Chinese Application 201310059319.7.
(Continued)

*Primary Examiner* — Huy D Vu
*Assistant Examiner* — Bao G Nguyen
(74) *Attorney, Agent, or Firm* — Nixon & Vanderhye P.C.

(57) ABSTRACT

Provided is a radio communication device which can suppress inter-code interference between an ACK/NACK signal and a CQI signal which are code-multiplexed. A diffusion unit (214) diffuses the ACK/NACK signal inputted from a judgment unit (208) by using a ZC sequence. A diffusion unit (219) diffuses the CQI signal by using a cyclic shift ZC sequence. By using a Walsh sequence, a diffusion unit (216) further diffuses the ACK/NACK signal which has been diffused by using the ZC sequence. A control unit (209) controls the diffusion unit (214), the diffusion unit (216), and the diffusion unit (219) so that the minimum value of the difference between the CQI signals from a plurality of mobile stations and a cyclic shift amount of the ACK/NACK signal is not smaller than the minimum value of the differ- (Continued)

ence between the cyclic shift amounts of the ACK/NACK signals from the plurality of mobile stations.

38 Claims, 17 Drawing Sheets

Related U.S. Application Data continuation of application No. 13/571,207, filed on Aug. 9, 2012, now Pat. No. 8,467,432, which is a continuation of application No. 13/349,435, filed on Jan. 12, 2012, now Pat. No. 8,275,021, which is a continuation of application No. 12/850,988, filed on Aug. 5, 2010, now Pat. No. 8,121,175, which is a continuation of application No. 12/600,835, filed as application No. PCT/JP2008/002199 on Aug. 12, 2008, now Pat. No. 7,965,760.

(51) Int. Cl.
| | |
|---|---|
| H04L 5/00 | (2006.01) |
| H04W 72/04 | (2009.01) |
| H04B 1/7103 | (2011.01) |
| H04J 13/18 | (2011.01) |
| H04J 13/00 | (2011.01) |
| H04L 25/03 | (2006.01) |
| H04L 1/12 | (2006.01) |
| H04W 88/02 | (2009.01) |
| H04W 88/08 | (2009.01) |

(52) U.S. Cl.
CPC ............ *H04J 13/18* (2013.01); *H04L 1/1671* (2013.01); *H04L 5/0016* (2013.01); *H04L 5/0055* (2013.01); *H04L 5/0057* (2013.01); *H04W 72/042* (2013.01); *H04W 72/0413* (2013.01); *H04W 72/0446* (2013.01); *H04J 13/0062* (2013.01); *H04L 25/03828* (2013.01); *H04L 2001/125* (2013.01); *H04W 88/02* (2013.01); *H04W 88/08* (2013.01)

(56) References Cited

U.S. PATENT DOCUMENTS

| | | |
|---|---|---|
| 8,532,581 B2 | 9/2013 | Nishio et al. |
| 2008/0075184 A1 | 3/2008 | Muharemovic et al. |
| 2008/0298433 A1 | 12/2008 | Tiirola et al. |
| 2008/0310540 A1 | 12/2008 | Tiirola et al. |
| 2008/0316957 A1 | 12/2008 | Shen et al. |
| 2009/0034505 A1 | 2/2009 | Papasakellariou et al. |
| 2009/0258600 A1 | 10/2009 | Nishio et al. |
| 2009/0303929 A1 | 12/2009 | Yamamoto et al. |
| 2010/0173641 A1 | 7/2010 | Kim et al. |

FOREIGN PATENT DOCUMENTS

| | | |
|---|---|---|
| JP | 2010-529801 A | 8/2010 |
| RU | 2226748 C2 | 4/2004 |
| WO | 2005/015801 A2 | 2/2005 |
| WO | 2008/053930 A1 | 5/2008 |

OTHER PUBLICATIONS

Chinese Office Action and Search Report and English translation thereof mailed Jun. 3, 2015 in CN application 201310059318.2.
JP Notice of Reasons for Rejection and English translation thereof mailed Jan. 19, 2016 in JP Patent Application 2014-240254.
Second CN Office Action and English translation thereof mailed Dec. 17, 2015 in CN Patent Application 201310059318.2.
Second CN Office Action and English translation thereof mailed Nov. 20, 2015 in CN Patent Application 201310059319.7.
EP Rule 69 Communication dated Nov. 9, 2015 in EP Patent Application 15172323.6.
Russian Office Action and English translation thereof mailed Feb. 19, 2014 in Russian Application No. 2012155872.
Extended EP Search Report mailed Nov. 18, 2013 in EP Application 13189579.9.
Extended EP Search Report mailed Nov. 18, 2013 in EP Application 13189580.7.
"3rd Generation Partnership Project; Technical Specification Group Radio Access Network; Evolved Universal Terrestrial Radio Access (E-UTRA); Physical Channels and Modulation (Release 8)," Technical Specification 3GPP TS 36.211 V8.3.0, Valbonne, France, May 2008, 77 pages.
3GPP TSG RAN WG1 Meeting #49bis, "Usage of Cyclic Shifts and block-wise spreading codes for Uplink ACK/NACK", R1-072799, Jun. 2007, 2 pages.
"COM-Based Multiplexing Method of Multiple ACK/NACK and CQI for E-UTRA Uplink," Report R1-062742, 3GPP TSG RAN WG1 Meeting #46bis, Seoul, Korea, Oct. 9-13, 2006, pp. 1-6.
"Commonality on the Cyclic Shift Hopping Patterns of ACK/NACK and CQI on PUCCH," Report R1-074901, 3GPP TSG RAN WG1 Meeting #51, Jeju, Korea, Nov. 5-9, 2007, pp. 1-2.
"Cyclic Shift Hopping Pattern for Uplink ACKINACK," Report R1-074411, 3GPP TSG RAN WG1 Meeting #50bis, Shanghai, Oct. 8-12, 2007, pp. 1-6.
Extended European Search Report, for corresponding European Application No. 08790447.0, dated Dec. 27, 2011, 6 pages.
"Implicit Mapping of CCE to UL ACKINACK Resource," Report R1-073122, 3GPP RAN WG1 Meeting #49bis, Orlando, Florida, Jun. 25-29, 2007, pp. 1-4.
International Search Report, mailed Nov. 18, 2008, issued in corresponding International Application No. PCT/JP2008/002199, filed Aug. 12, 2008.
KDDI, "Uplink Data-Non-Associated Control Signaling in E-UTRA," Report R1-073072, 3rd Generation Partnership Project (3GPPTM) TSG RAN WG1 Meeting #49bis, Orlando, Florida, Jun. 25-29, 2007, pp. 1-5.
"Multiplexing Capability of CQIs and ACK/NACKs Form Different UEs," Report R1-072315, 3GPP TSG RAN WG1 Meeting Kobe, Japan, May 7-11, 2007,4 pages.
Nokia Siemens Networks, Nokia, "ACKINACK performance of high speed UEs," R1-073002, Agenda Item: 5.13.2, 3GPP TSG RAN WG1 Meeting #49bis, Orlando, USA, Jun. 25-29, 2007,4 pages.
Notice of Reasons for Rejection, mailed Feb. 9, 2010, issued in corresponding Japanese Patent Application No. 2009-528033, filed Aug. 6, 2009,3 pages.
Samsung, "Cyclic Shift Hopping of UL ACK Channels," R1-073149, Agenda Item: 5.13.2, 3GPP TSG RAN WG1 Meeting #49bis, Orlando, USA, Jun. 25-29, 2007,6 pages.
"Scrambling Code for L 1JL2 Control Channel With Com Based Multiplexing in E-UTRA Downlink," Report R1-06294 3GPP TSG RAN WG1 Meeting #46bis, Seoul, Oct. 9-13, 2006, pp. 1-4.
"Signaling of Implicit ACKINACK Resources," Report R1-073006, 3GPP TSG RAN WG1 Meeting #49bis, Orlando, Florida, Jun. 25-29, 2007, 8 pages.
"Signaling Parameters for UL ACK/NACK Resources," R1-073616, 3GPP TSG RAN WG1 Meeting #50, Athens, Aug. 20-24, 2007, pp. 1-3.
"Variable Phase Definition of the Reference Signal for CQI in PUCCH," Report R1-073621, 3GPP TSG RAN WG1 Meeting Athens, Aug. 20-24, 2007, pp. 1-5.
Office Action, for Russian Application No. 2010105059107(007123), dated Jun. 15, 2012, 5 pages.
Extended European Search Report mailed Jul. 28, 2015 in EP Application 15172323.6.
Japanese Office Action and Search Report and English translation thereof mailed Sep. 15, 2015 in JP application 2014-240254.

FIG.6

RADIO COMMNICATION DEVICE AND RESPONSE SIGNAL DIFFUSION METHOD

This application is a continuation of U.S. patent application Ser. No. 13/860,398 filed Apr. 10, 2013, which is a continuation of U.S. patent application Ser. No. 13/571,207, filed Aug. 9, 2012, which is a continuation of U.S. patent application Ser. No. 13/349,435, filed Jan. 12, 2012, which is a continuation of U.S. patent application Ser. No. 12/850,988, filed Aug. 5, 2010, which is a continuation of U.S. patent application Ser. No. 12/600,835, filed Nov. 18, 2009, which is the national phase application of PCT application PCT/JP2008/002199, filed Aug. 12, 2008, which claims priority of Japanese Application 2007-211102, filed Aug. 13, 2007, the entire contents of which are hereby incorporated by reference.

BACKGROUND

Technical Field

The present disclosure relates to a radio communication apparatus and response signal spreading method.

Background Art

In mobile communications, ARQ (Automatic Repeat Request) is applied to downlink data from a radio communication base station apparatus (hereinafter abbreviated to "base station") to a radio communication mobile station apparatus (hereinafter abbreviated to "mobile station"). That is to say, a mobile station feeds back a response signal representing error detection results of downlink data, to the base station. A mobile station performs a CRC (Cyclic Redundancy Check) on downlink data, and, if CRC=OK is found (no error), feed back an ACK (ACKnowledgement), and, if CRC=NG is found (error present), feed back a NACK (Negative ACKnowledgement), as a response signal to the base station. This response signal is transmitted to the base station using an uplink control channel such as a PUCCH (Physical Uplink Control Channel), for example.

Furthermore, a base station transmits control information for reporting a downlink data resource allocation result to a mobile station. This control information is transmitted to a mobile station using a downlink control channel such as an L1/L2CCH (L1/L2 Control Channel), for example. Each L1/L2CCH occupies one or a plurality of CCEs (Control Channel Elements). When one L1/L2CCH occupies a plurality of CCEs, one L1/L2CCH occupies a consecutive plurality of CCEs. The base station allocates an L1/L2CCH from among a plurality of L1/L2CCHs for each mobile station in accordance with the number of CCEs necessary for carrying control information, and transmits control information mapped on a physical resource corresponding to a CCE occupied by each L1/L2CCH.

In order to use downlink communication resources efficiently, mutually mapping between CCE's and PUCCH's has been investigated. Each mobile station can determine a PUCCH to be used for transmission of a response signal from that mobile station from a CCE corresponding to a physical resource to which control information for that mobile station is mapped in accordance with this mapping.

Also, investigation has been carried out into code-multiplexing a plurality of response signals from a plurality of mobile stations by means of spreading using a ZC (Zadoff-Chu) sequence and Walsh sequence, as shown in FIG. 1 (see Non-Patent Document 1). In FIG. 1, ($W_0$, $W_1$, $W_2$, $W_3$) represents a Walsh sequence with a sequence length of four. As shown in FIG. 1, in a mobile station, first, a response signal of ACK or NACK is subject to first spreading to one symbol by a ZC sequence (with a sequence length of twelve) in the frequency domain. Then a response signal subjected to first spreading is subject to an IFFT (Inverse Fast Fourier Transform) in association with $W_0$ to $W_3$. A response signal that has been spread in the frequency domain by a ZC sequence with a sequence length of twelve is transformed to a time-domain ZC sequence with a sequence length of twelve by this IFFT. Then this signal subjected to the IFFT is subject to second spreading using a Walsh sequence (with a sequence length of four). That is to say, one response signal is arranged in four symbols $S_0$ through $S_3$. Response signal spreading is also performed in a similar way in other mobile stations using a ZC sequence and Walsh sequence. However, different mobile stations use ZC sequences with mutually different Cyclic Shift values in the time domain, or mutually different Walsh sequences. Here, since the time-domain sequence length of a ZC sequence is twelve, it is possible to use twelve ZC sequences with cyclic shift values of 0 through 11 generated from the same ZC sequence. Also, since the sequence length of a Walsh sequence is four, four mutually different Walsh sequences can be used. Therefore, in an ideal communication environment, response signals from a maximum of forty eight (12.times.4) mobile stations can be code-multiplexed.

Here, cross-correlation between ZC sequences with mutually different cyclic shift values generated from the same ZC sequence is 0. Therefore, in an ideal communication environment, as shown in FIG. 2, a plurality of code-multiplexed response signals spread by ZC sequences with mutually different cyclic shift values (cyclic shift values of 0 through 11) can be separated without inter-code interference in the time domain by correlation processing in the base station.

In the case of the 3GPP LTE (3rd Generation Partnership Project Long Term Evolution) PUCCH, a CQI (Channel Quality Indicator) signal is code-multiplexed as well as the above-described ACK/NACK signals. While an ACK/NACK signal is 1-symbol information, as shown in FIG. 1, a CQI signal is 5-symbol information. As shown in FIG. 3, a mobile station spreads a CQI signal by a ZC sequence with a sequence length of twelve and cyclic shift value P, and transmits the spread CQI signal after performing IFFT processing. Since a Walsh sequence is not applied to a CQI signal, a Walsh sequence cannot be used in the base station for separation of an ACK/NACK signal and CQI signal. Thus, by performing despreading by a ZC sequence of an ACK/NACK signal and CQI signal spread by ZC sequences corresponding to different cyclic shifts, a base station can separate the ACK/NACK signal and CQI signal with almost no inter-code interference.

However, due to an influence of transmission timing difference in mobile station, multipath delayed waves, frequency offset, and so forth, a plurality of ACK/NACK signals and CQI signals from a plurality of mobile stations do not necessarily reach a base station at the same time. To take the case of an ACK/NACK signal as an example, as shown in FIG. 4, if the transmission timing of an ACK/NACK signal spread by a ZC sequence with a cyclic shift value of 0 is delayed from the correct transmission timing, the correlation peak of the ZC sequence with a cyclic shift value of 0 appears in the detection window of a ZC sequence with a cyclic shift value of 1. Also, as shown in FIG. 5, if there is a delayed wave in an ACK/NACK spread by a ZC sequence with a cyclic shift value of 0, interference leakage due to that delayed wave appears in the detection window of a ZC sequence with a cyclic shift value of 1. That is to say, in these cases, a ZC sequence with a cyclic shift value of 1 receives interference from a ZC sequence with a cyclic shift value of 0. Therefore, in these cases, separability of an ACK/NACK signal spread by a ZC sequence with a cyclic shift value of 0 and an ACK/NACK signal spread by a ZC sequence with a cyclic shift value of 1 degrades. That is to say, if ZC sequences with mutually adjacent cyclic shift values are used, there is a possibility of ACK/NACK signal separability degrading.

Thus, heretofore, when performing code multiplexing of a plurality of response signals by ZC sequence spreading, a cyclic shift value difference (cyclic shift interval) has been provided between ZC sequences that is sufficient to prevent the occurrence of inter-code interference between ZC sequences. For example, the cyclic shift value difference between ZC sequences is made 2, and of twelve ZC sequences with cyclic shift values of 0 through 11, only the six ZC sequences corresponding to cyclic shift values 0, 2, 4, 6, 8, and 10 are used for first spreading of a response signal. Therefore, when using a Walsh sequence with a sequence length of four for second spreading of a response signal, response signals from a maximum of twenty four (6×4) mobile stations can be code-multiplexed.

In Non-Patent Document 2, an example is disclosed in which, on a response signal from a mobile station, first spreading is performed using six ZC sequences with cyclic shift values 0, 2, 4, 6, 8, and 10, and second spreading is performed using Walsh sequences with sequence length of four. FIG. 6 is a drawing showing, by a mesh structure, an arrangement of CCEs that can be allocated to mobile stations for ACK/NACK signal transmission use (hereinafter abbreviated to "ACK/NACK use"). Here, it is assumed that a CCE number and a PUCCH number defined by a ZC sequence cyclic shift value and Walsh sequence number are mapped on a one-to-one basis. That is to say, it is assumed that CCE #1 and PUCCH #1, CCE #2 and PUCCH #2, CCE #3 and PUCCH #3, and so on, are mutually mapped (the same applying subsequently). In FIG. 6, the horizontal axis indicates a ZC sequence cyclic shift value, and the vertical axis indicates a Walsh sequence number. Since inter-code interference is extremely unlikely to occur between Walsh sequences #0 and #2, as shown in FIG. 6 ZC sequences with the same cyclic shift values are used for CCEs subjected to second spreading by Walsh sequence #0 and CCEs subjected to second spreading by Walsh sequence #2.

Non-patent Document 1: Multiplexing capability of CQIs and ACK/NACKs from different UEs (ftp://ftp.3gpp.org/TSG_RAN/WG1_RL1/TSGR1.sub.--49/Docs/R1-072315.zip)

Non-patent Document 2: Signaling of Implicit ACK/NACK resources (ftp://ftp.3gpp.org/TSG_RAN/WG1_RL1/TSGR1.sub.--49/Docs/R1-073006.zip)

BRIEF SUMMARY

As described above, in the case of the 3GPP LTE PUCCH, a CQI signal is code-multiplexed as well as an ACK/NACK signal. Therefore, it is conceivable for provision to be made so that, of the CCEs having the 2-cyclic-shift-interval mesh structure shown in FIG. 6, CCEs using ZC sequences with a cyclic shift value of three and a cyclic shift value of 4 are employed for CQI use, and are not employed for ACK/NACK use. Such an arrangement of CCEs that can be allocated for CQI use and for ACK/NACK use is shown in FIG. 7. A problem with the mesh structure shown in FIG. 7 is that the cyclic shift interval between CCE #3 or CCE #15 and CCE #9 becomes 1, and inter-code interference between ZC sequences increases.

An embodiment provides a radio communication apparatus and response signal spreading method that facilitates suppressing inter-code interference between an ACK/NACK signal and CQI signal that are code-multiplexed.

An embodiment of a radio communication apparatus employs a configuration having: a first spreading section that performs first spreading of a first response signal or second response signal using one of a plurality of first sequences that are mutually separable because of mutually different cyclic shift values; a second spreading section that performs second spreading of the first response signal after first spreading using one of a plurality of second sequences; and a control section that controls the first spreading section and the second spreading section so that a minimum value of a difference in cyclic shift values between the first response signal and the second response signal from a plurality of mobile stations is greater than or equal to a minimum value of a difference in cyclic shift values between the second response signals from the plurality of mobile stations.

An embodiment facilitates suppressing inter-code interference between an ACK/NACK signal and a CQI signal that are code-multiplexed.

BRIEF DESCRIPTION OF THE DRAWINGS

Figure 6:
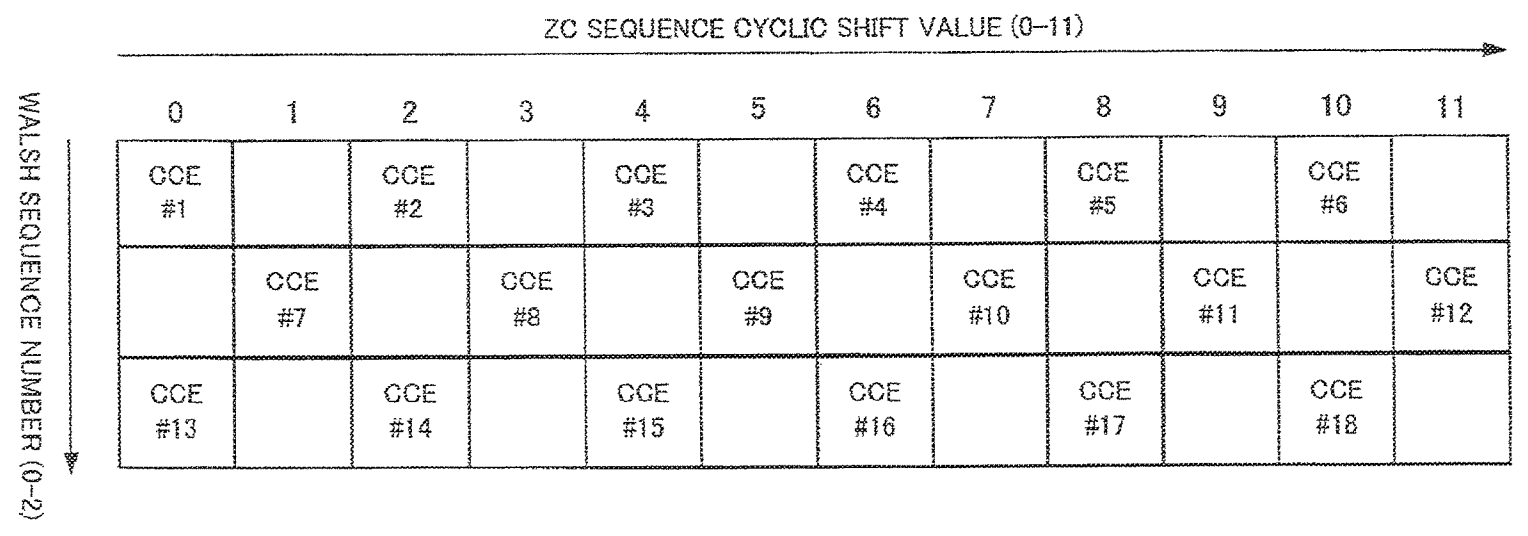

FIG. 6 is a drawing showing mapping between a ZC sequence, Walsh sequence, and CCEs (conventional case 1);

DETAILED DESCRIPTION

Now, example embodiments will be described in detail with reference to the accompanying drawings.

Embodiment 1

Figure 1:
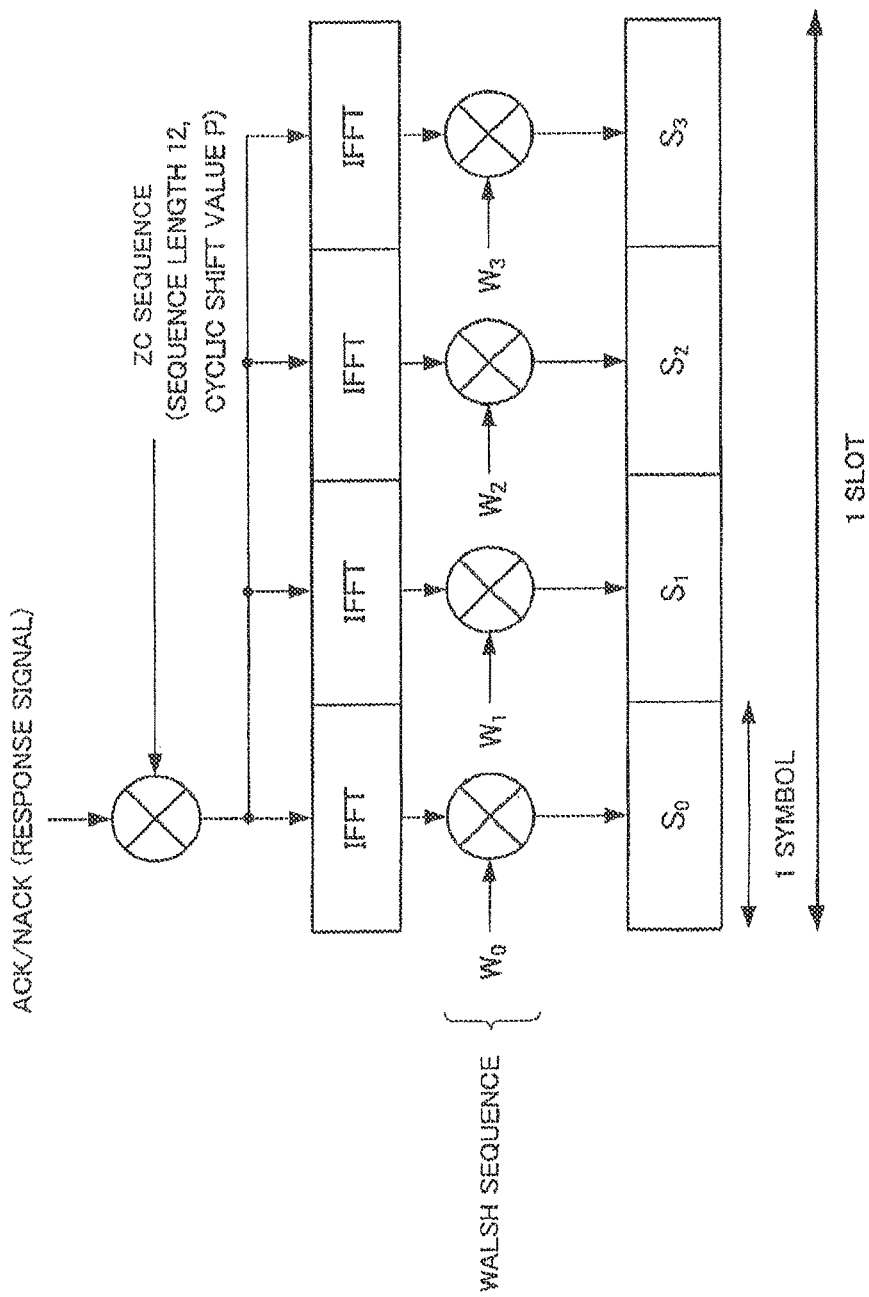
FIG. 1 is a drawing showing a response signal spreading method (conventional)
Figure 2:
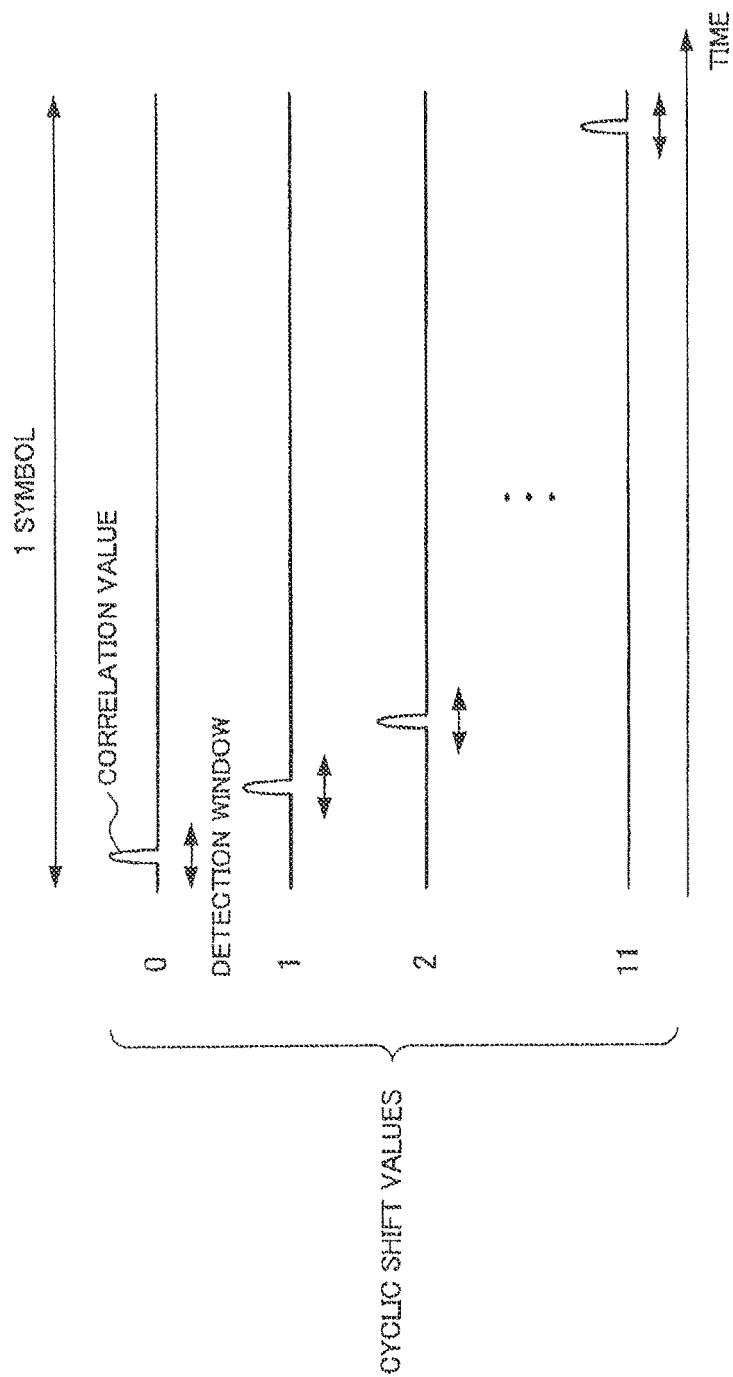
FIG. 2 is a drawing showing correlation processing of response signals spread by a ZC sequence (in the case of an ideal communication environment)
Figure 3:
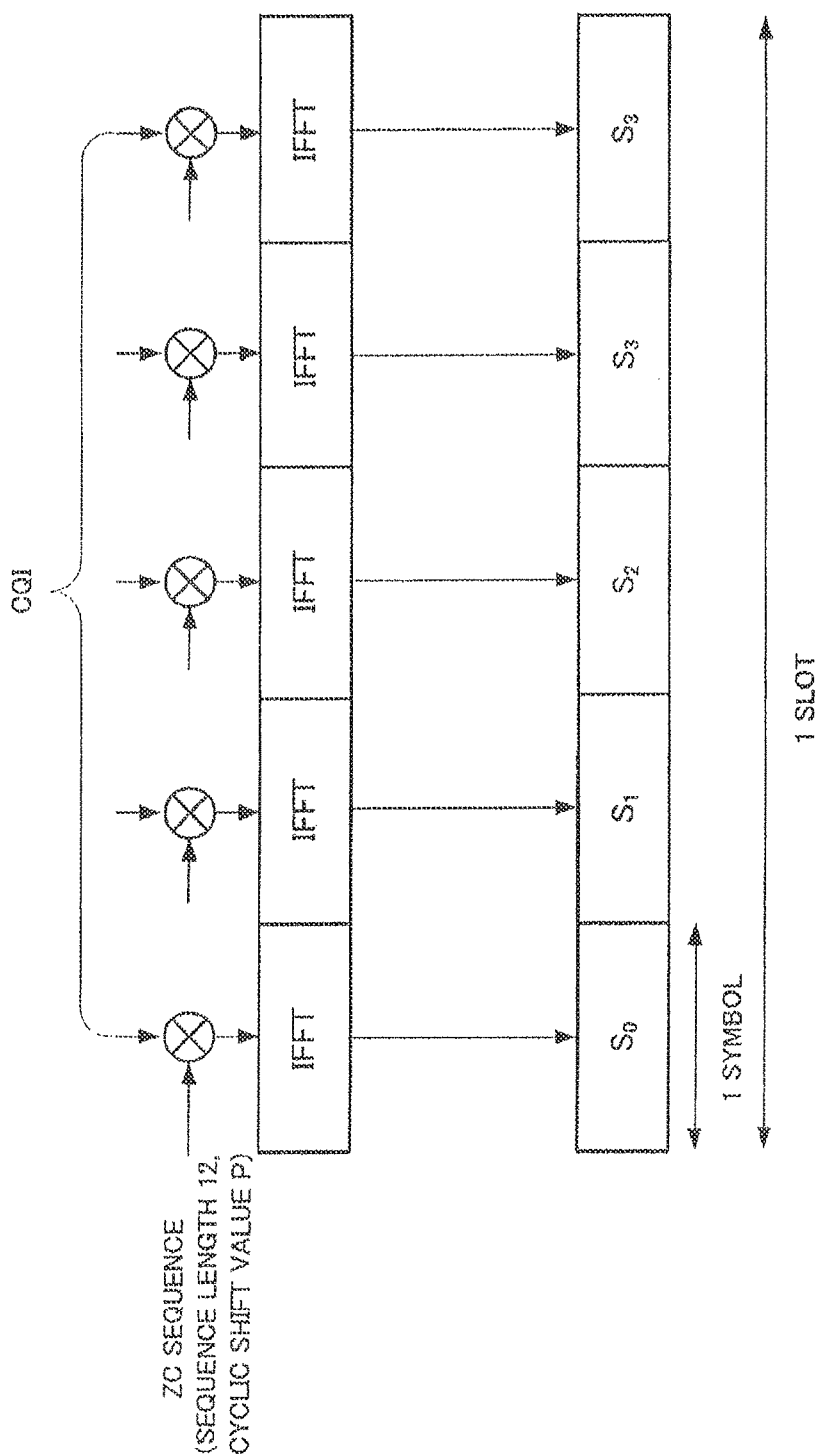
FIG. 3 is a drawing showing a CQI signal spreading method (conventional)
Figure 4:
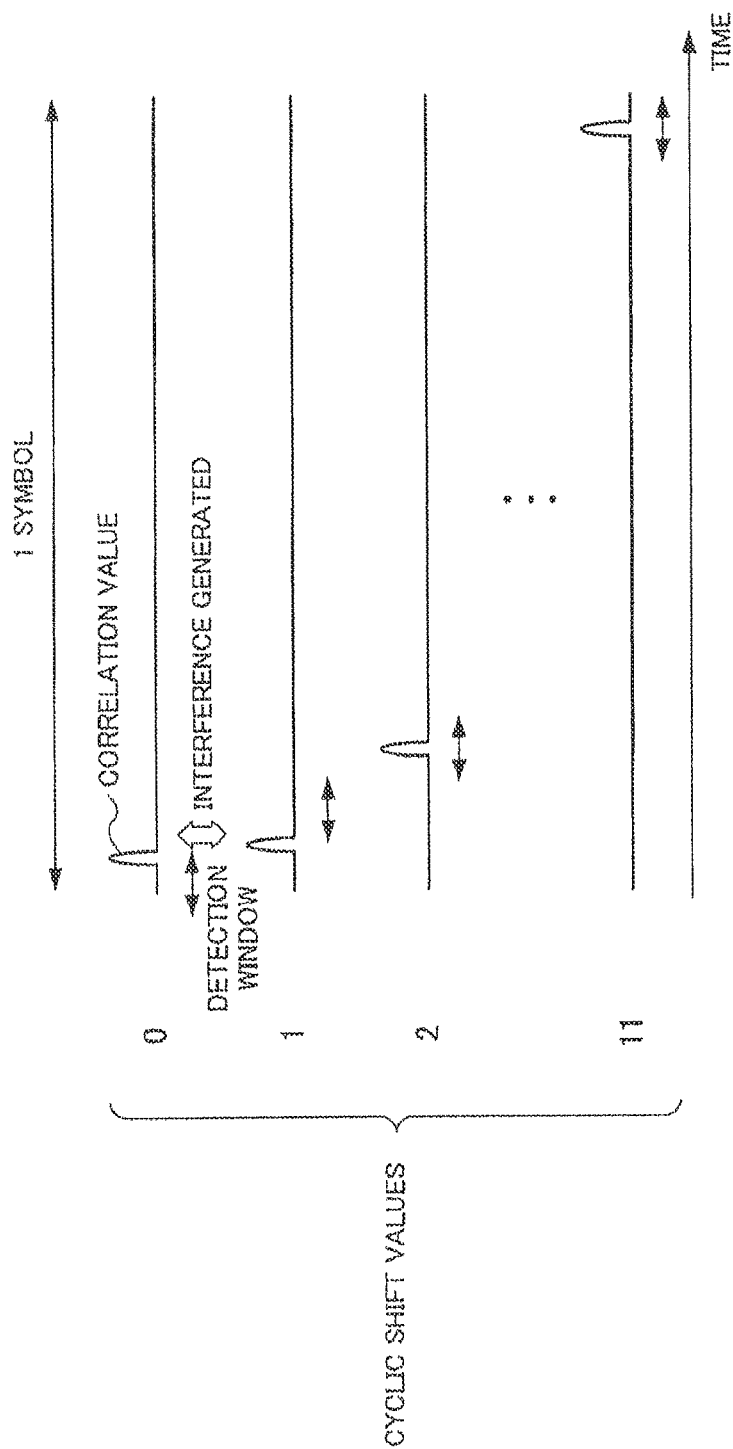
FIG. 4 is a drawing showing correlation processing of response signals spread by a ZC sequence (when there is transmission timing difference)
Figure 5:
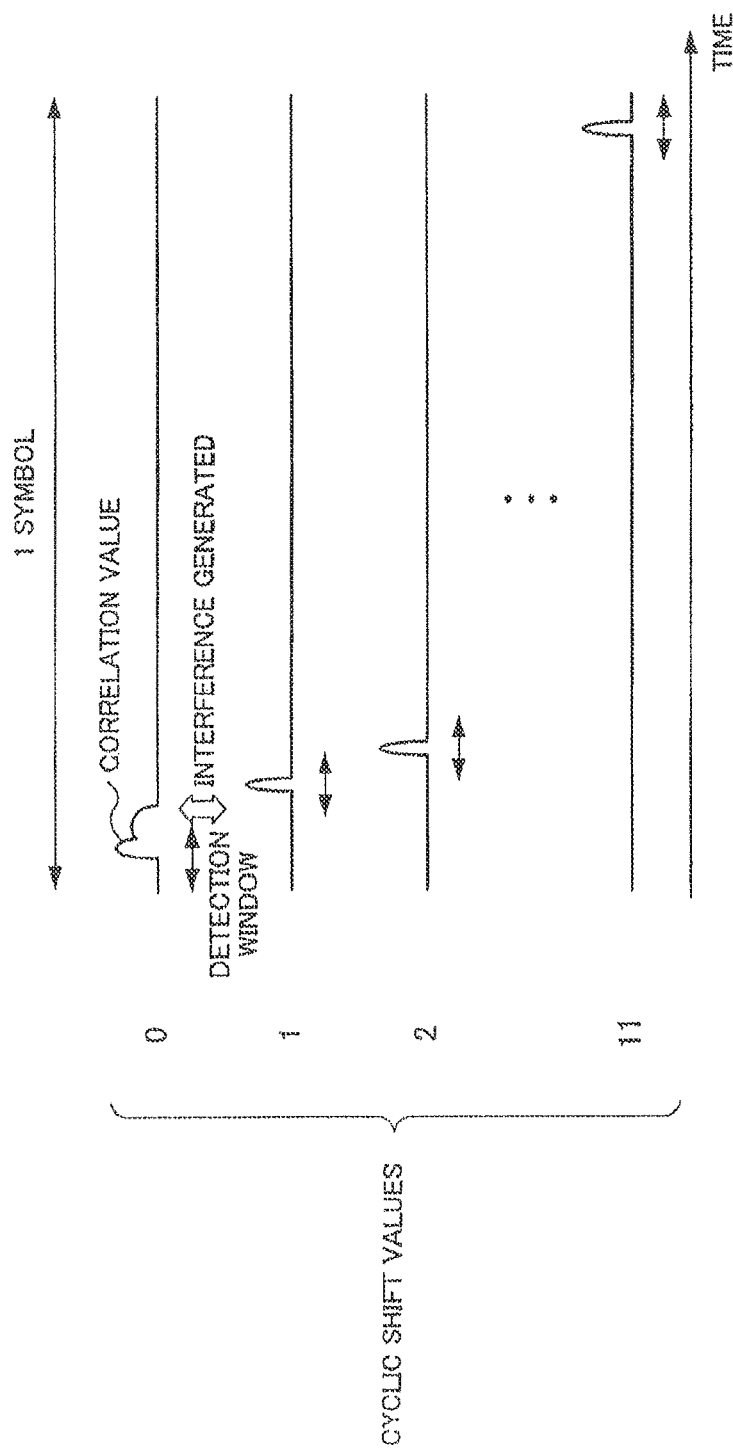
FIG. 5 is a drawing showing correlation processing of response signals spread by a ZC sequence (when there is a delayed wave)
Figure 7:
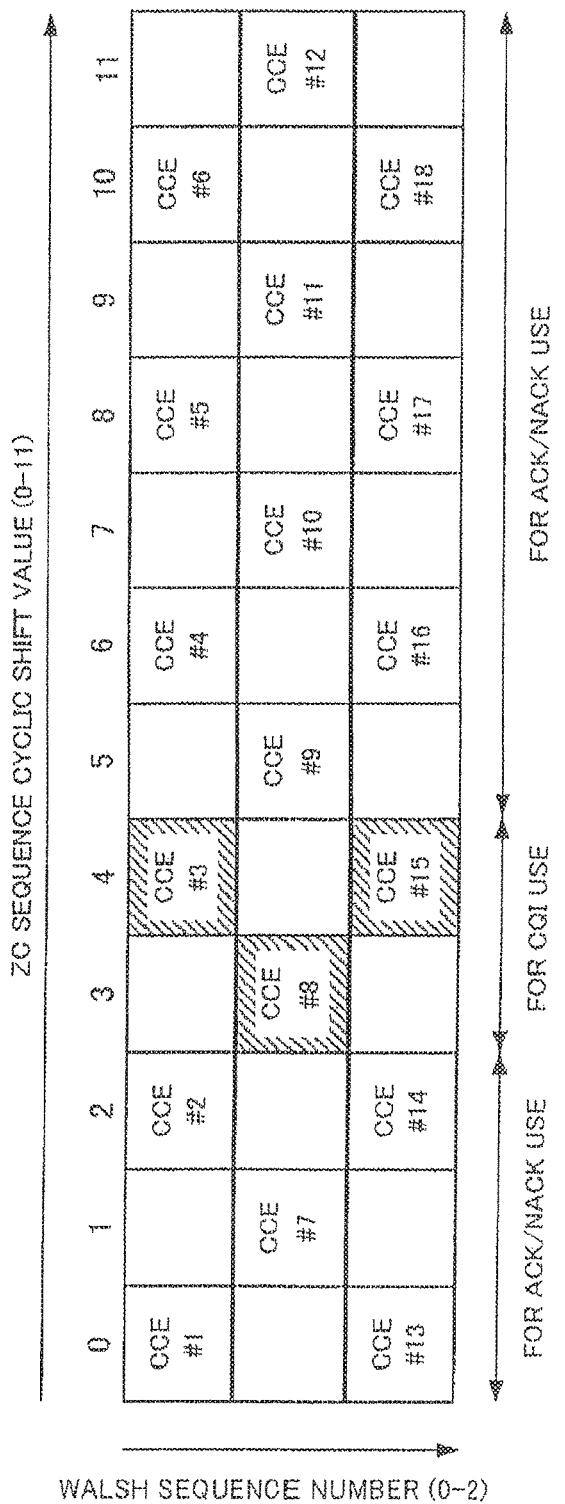
FIG. 7 is a drawing showing mapping between a ZC sequence, Walsh sequence, and CCEs (conventional case 1)
Figure 8:
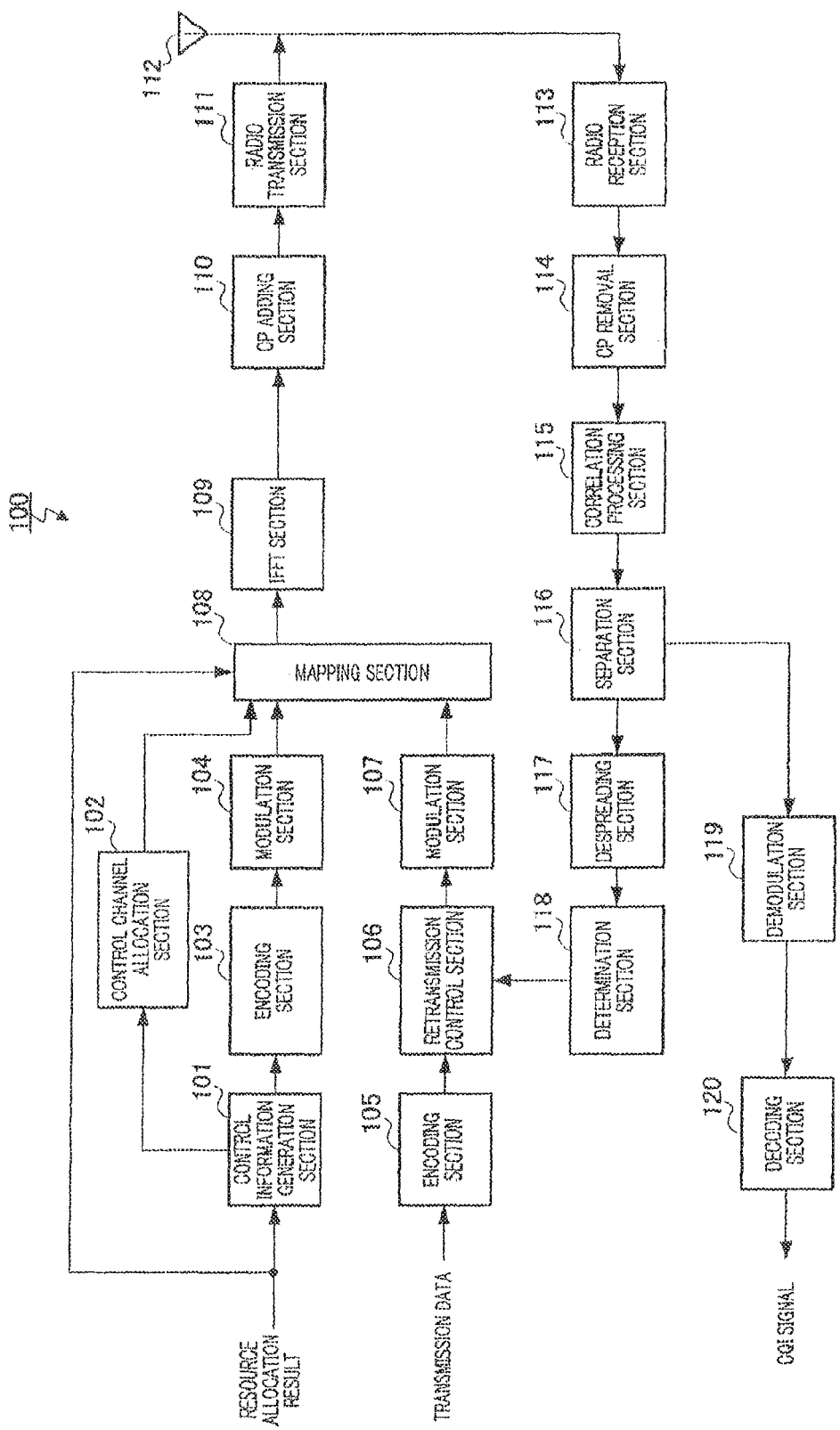
FIG. 8 is a drawing showing the configuration of a base station according to an embodiment.
Figure 9:
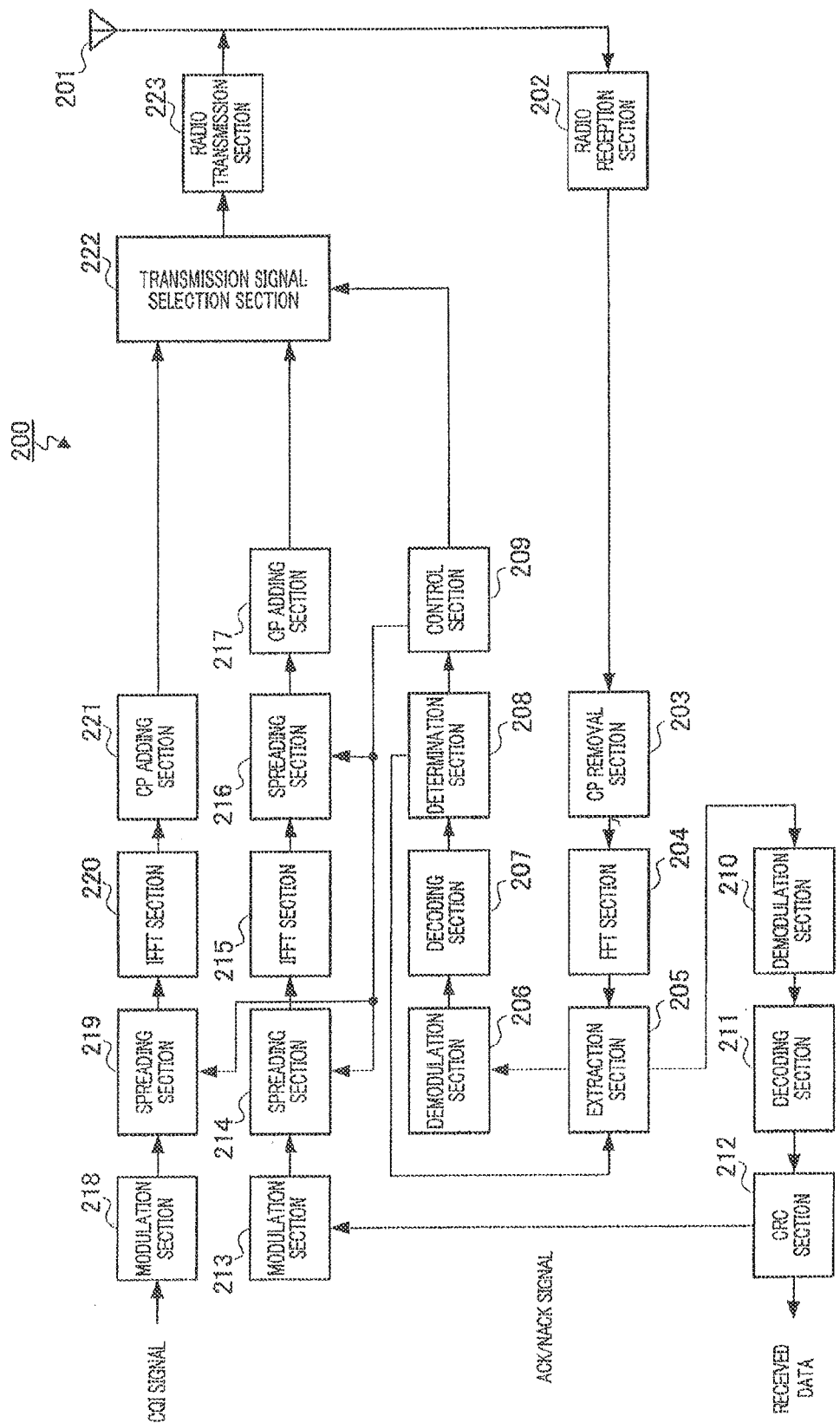
FIG. 9 is a drawing showing the configuration of a mobile station according to an embodiment.

The configuration of base station 100 according to Embodiment 1 is shown in FIG. 8, and the configuration of mobile station 200 according to Embodiment 1 is shown in FIG. 9.

To prevent the description from becoming complex, FIG. 8 shows components relating to the transmission of downlink data and uplink reception of an ACK/NACK signal corresponding to that downlink data, closely related to the present disclosure, while components relating to the reception of uplink data are omitted from the drawing and the description. Similarly, FIG. 9 shows components relating to the reception of downlink data, and uplink transmission of an ACK/NACK signal corresponding to that downlink data, closely related to the present disclosure, while components relating to the transmission of uplink data are omitted from the drawing and the description.

In the following description, a case is described in which a ZC sequence is used for first spreading and a Walsh sequence is used for second spreading. However, as well as ZC sequences, sequences that are mutually separable because of mutually different cyclic shift values may also be used for first spreading, and similarly, an orthogonal sequence other than a Walsh sequence may be used for second spreading.

In the following description, a case is described in which a ZC sequence with a sequence length of twelve and a Walsh sequence with a sequence length of three ($W_0$, $W_1$, $W_2$) are used. However, the present disclosure is not limited to these sequence lengths.

In the following description, twelve ZC sequences with cyclic shift values of 0 through 11 are denoted by ZC #0 through ZC #11, and three Walsh sequences with sequence numbers 0 through 2 are denoted by W #0 through W #2.

In the following description, it is assumed that L1/L2CCH #1 occupies CCE #1, L1/L2CCH #2 occupies CCE #2, L1/L2CCH #3 occupies CCE #3, L1/L2CCH #4 occupies CCE #4 and CCE #5, L1/L2CCH occupies CCE #6 and CCE #7, L1/L2CCH #6 occupies CCE #8 through CCE #11, and so on.

In the following description, it is assumed that a CCE number and a PUCCH number defined by a ZC sequence cyclic shift value and Walsh sequence number are mapped on a one-to-one basis. That is to say, it is assumed that CCE #1 and PUCCH #1, CCE #2 and PUCCH #2, CCE #3 and PUCCH #3 and so on, are mutually mapped.

As explained above, in order to use downlink communication resources efficiently in mobile communication, a mobile station determines a PUCCH to be used for transmission of a response signal from that mobile station from a CCE corresponding to a physical resource to which L1/L2CCH control information for that mobile station is mapped. Therefore, base station 100 according to this embodiment allocates to each mobile station an L1/L2CCH comprising a CCE that is appropriate as a PUCCH for that mobile station.

In base station 100 shown in FIG. 8, control information generation section 101 generates control information for carrying a resource allocation result per mobile station, and outputs this control information to control channel allocation section 102 and encoding section 103. Control information, provided per mobile station, includes mobile station ID information indicating the mobile station to which the control information is addressed. For example, CRC that is masked by an ID number of a control information report destination mobile station is included in control information as mobile station ID information. Control information of each mobile station is encoded by encoding section 103, modulated by modulation section 104, and inputted to mapping section 108.

Control channel allocation section 102 allocates an L1/L2CCH from among a plurality of L1/L2CCHs for each mobile station in accordance with the number of CCEs necessary for carrying control information. Here, control channel allocation section 102 references a CCE corresponding to a PUCCH of each mobile station and allocates an L1/L2CCH to each mobile station. Details of CCEs corresponding to PUCCHs of mobile stations will be given later herein. Control channel allocation section 102 outputs a CCE number corresponding to an allocated L1/L2CCH to mapping section 108. For example, when the number of CCEs necessary for carrying control information to mobile station #1 is 1 and L1/L2CCH #1 has consequently been allocated to mobile station #1, control information generation section 101 outputs CCE number #1 to mapping section 108. And when the number of CCEs necessary for carrying control information to mobile station #1 is four and L1/L2CCH #6 has consequently been allocated to mobile station #1, control information generation section 101 outputs CCE numbers #8 through #11 to mapping section 108.

On the other hand, encoding section 105 encodes transmission data (downlink data) to each mobile station, and outputs this data to retransmission control section 106.

At the time of an initial transmission, retransmission control section 106 holds encoded transmission data of each mobile station, and also outputs this data to modulation section 107. Retransmission control section 106 holds transmission data until an ACK from a mobile station is received as input from determination section 118. If a NACK from a mobile station is received as input from determination section 118—that is, at the time of a retransmission—retransmission control section 106 outputs transmission data corresponding to that NACK to modulation section 107.

Modulation section 107 modulates encoded transmission data received as input from retransmission control section 106, and outputs this data to mapping section 108.

At the time of control information transmission, mapping section 108 maps control information received as input from modulation section 104 on a physical resource in accordance with a CCE number received as input from control channel allocation section 102, and outputs this to IFFT section 109. That is to say, mapping section 108 maps control information of each mobile station on a subcarrier corresponding to a CCE number in a plurality of subcarriers comprised of an OFDM symbol.

On the other hand, at the time of downlink data transmission, mapping section 108 maps transmission data for each mobile station on a physical resource in accordance with a resource allocation result, and outputs this data to IFFT section 109. That is to say, mapping section 108 maps transmission data of each mobile station on one of a plurality of subcarriers comprised of an OFDM symbol in accordance with a resource allocation result.

IFFT section 109 performs IFFT processing on a plurality of subcarriers to which control information or transmission data is mapped to generate an OFDM symbol, and outputs this to CP (Cyclic Prefix) adding section 110.

CP adding section 110 adds the same signal as at the end of the OFDM symbol to the front of the OFDM symbol as a CP.

Radio transmission section 111 performs transmission processing such as D/A conversion, amplification, and up-conversion on an OFDM symbol with a CP, and transmits the symbol to mobile station 200 (FIG. 9) from antenna 112.

Meanwhile, radio reception section 113 receives a signal transmitted from mobile station 200 via antenna 112, and performs reception processing such as down-conversion and A/D conversion on the received signal. In the received signal, an ACK/NACK signal transmitted from a particular mobile station is code-multiplexed with a CQI signal transmitted from another mobile station.

CP removal section 114 removes a CP added to the signal after reception processing.

Correlation processing section 115 finds a correlation value between the signal received as input from CP removal section 114 and a ZC sequence used for first spreading in mobile station 200. That is to say, correlation processing section 115 outputs a correlation result found by using a ZC sequence corresponding to a cyclic shift value allocated to an ACK/NACK signal, and a correlation result found by using a ZC sequence corresponding to a cyclic shift value allocated to a CQI signal, to separation section 116.

Based on correlation values received as input from correlation processing section 115, separation section 116 outputs an ACK/NACK signal to despreading section 117, and outputs a CQI signal to demodulation section 119.

Despreading section 117 performs despreading of an ACK/NACK signal received as input from separation section 116 by a Walsh sequence used for second spreading in mobile station 200, and outputs a signal after despreading to determination section 118.

Determination section 118 detects a ACK/NACK signal of each mobile station by detecting a correlation peak on an individual mobile station basis using a detection window set for each mobile station in the time domain. For example, when a correlation peak is detected in detection window #1 for mobile station #1 use, determination section 118 detects an ACK/NACK signal from mobile station #1, and when a correlation peak is detected in detection window #2 for mobile station #2 use, determination section 118 detects an ACK/NACK signal from mobile station #2. Then determination section 118 determines whether the detected ACK/NACK signal is ACK or NACK, and outputs a ACK or NACK of each mobile station to retransmission control section 106.

Demodulation section 119 demodulates a CQI signal received as input from separation section 116, and decoding section 120 decodes the demodulated CQI signal and outputs a CQI signal.

Meanwhile, in mobile station 200 shown in FIG. 9, radio reception section 202 receives an OFDM symbol transmitted from base station 100 via antenna 201, and performs reception processing such as down-conversion and A/D conversion on the OFDM symbol.

CP removal section 203 removes a CP added to the signal after reception processing.

FFT (Fast Fourier Transform) section 204 performs FFT processing on the OFDM symbol to obtain control information or downlink data mapped on a plurality of subcarriers, and outputs these to extraction section 205.

When control information is received, extraction section 205 extracts control information from the plurality of subcarriers and outputs this control information to demodulation section 206. This control information is demodulated by demodulation section 206, decoded by decoding section 207, and inputted to determination section 208.

On the other hand, when downlink data is received, extraction section 205 extracts downlink data addressed to that mobile station from the plurality of subcarriers and outputs this data to demodulation section 210. This downlink data is demodulated by demodulation section 210, decoded by decoding section 211, and inputted to CRC section 212.

CRC section 212 performs error detection using a CRC on downlink data after decoding, generates ACK if CRC=OK (no error), or NACK if CRC=NG (error present), and outputs the generated ACK/NACK signal to modulation section 213. If CRC=OK (no error), CRC section 212 also outputs downlink data after decoding as received data.

Determination section 208 determines whether or not control information received as input from decoding section 207 is control information addressed to that mobile station. For example, determination section 208 determines that control information for which CRC=OK (no error) is control information addressed to that mobile station by performing demasking using that mobile station's ID number. Then determination section 208 outputs control information addressed to that mobile station—that is, a resource allocation result of downlink data for that mobile station—to extraction section 205. Determination section 208 also determines a PUCCH number to be used for transmission of an ACK/NACK signal from that mobile station from a CCE number corresponding to a subcarrier to which control information addressed to that mobile station has been mapped, and outputs the determination result (PUCCH number) to control section 209. For example, since control information is mapped on a subcarrier corresponding to CCE #1, determination section 208 of mobile station 200 to which above L1/L2CCH #1 has been allocated determines PUCCH #1 corresponding to CCE #1 to be a PUCCH for use by that mobile station. Similarly, since control information is mapped on subcarriers corresponding to CCE #8 through CCE #11, determination section 208 of mobile station 200 to which above L1/L2CCH #6 has been allocated determines PUCCH #8 corresponding to CCE #8 having the lowest number among CCE #8 through CCE #11 to be a PUCCH for use by that mobile station.

Control section 209 controls a cyclic shift value of a ZC sequence used for first spreading by spreading section 214 and spreading section 219, and a Walsh sequence used for second spreading by spreading section 216, in accordance with a PUCCH number received as input from determination section 208. That is to say, control section 209 sets a ZC sequence with a cyclic shift value corresponding to a PUCCH number received as input from determination section 208 in spreading section 214 and spreading section 219, and sets a Walsh sequence corresponding to a PUCCH number received as input from determination section 208 in spreading section 216. Also, control section 209 controls transmission signal selection section 222 such that, if directed to transmit a CQI in advance by base station 100, transmission signal selection section 222 selects CQI signal transmission, or if not directed to transmit a CQI, transmission signal selection section 222 transmits an ACK/NACK signal generated based on CRC=NG (error present) in determination section 208.

Modulation section 213 modulates an ACK/NACK signal received as input from CRC section 212, and outputs this modulated signal to spreading section 214. Spreading section 214 performs first spreading of the ACK/NACK signal by a ZC sequence set by control section 209, and outputs an ACK/NACK signal after first spreading to IFFT section 215. IFFT section 215 performs IFFT processing on the ACK/NACK signal after first spreading, and outputs an ACK/NACK signal after IFFT to spreading section 216. Spreading section 216 performs second spreading of the ACK/NACK signal with a CP by a Walsh sequence set by control section 209, and outputs an ACK/NACK signal after second spreading to CP adding section 217. CP adding section 217 adds the same signal as at the end of the ACK/NACK signal after IFFT to the front of that ACK/NACK signal as a CP, and outputs the resulting signal to transmission signal selection section 222. Modulation section 213, spreading section 214, IFFT section 215, spreading section 216, and CP adding section 217 function as an ACK/NACK signal transmission processing section.

Modulation section 218 modulates a CQI signal and outputs the modulated signal to spreading section 219. Spreading section 219 spreads the CQI signal by a ZC sequence set by control section 209, and outputs a CQI signal after spreading to IFFT section 220. IFFT section 220 performs IFFT processing on the CQI signal after spreading, and outputs a CQI signal after IFFT to CP adding section 221. CP adding section 221 adds the same signal as at the end of the CQI signal after IFFT to the front of that CQI signal as a CP, and outputs a CQI signal to which a CP has been added to transmission signal selection section 222.

Transmission signal selection section 222 selects either an ACK/NACK signal received as input from CP adding section 217 or a CQI signal received as input from CP adding section 221 according to the setting of control section 209, and outputs the selected signal to radio transmission section 223 as a transmission signal.

Radio transmission section 223 performs transmission processing such as D/A conversion, amplification, and up-conversion on the transmission signal received as input from transmission signal selection section 222, and transmits the signal to base station 100 (FIG. 8) from antenna 201.

Next, a detailed description will be given of CCEs corresponding to PUCCHs of mobile stations that are referenced in control channel allocation by control channel allocation section 102 (FIG. 8).

Figure 10:
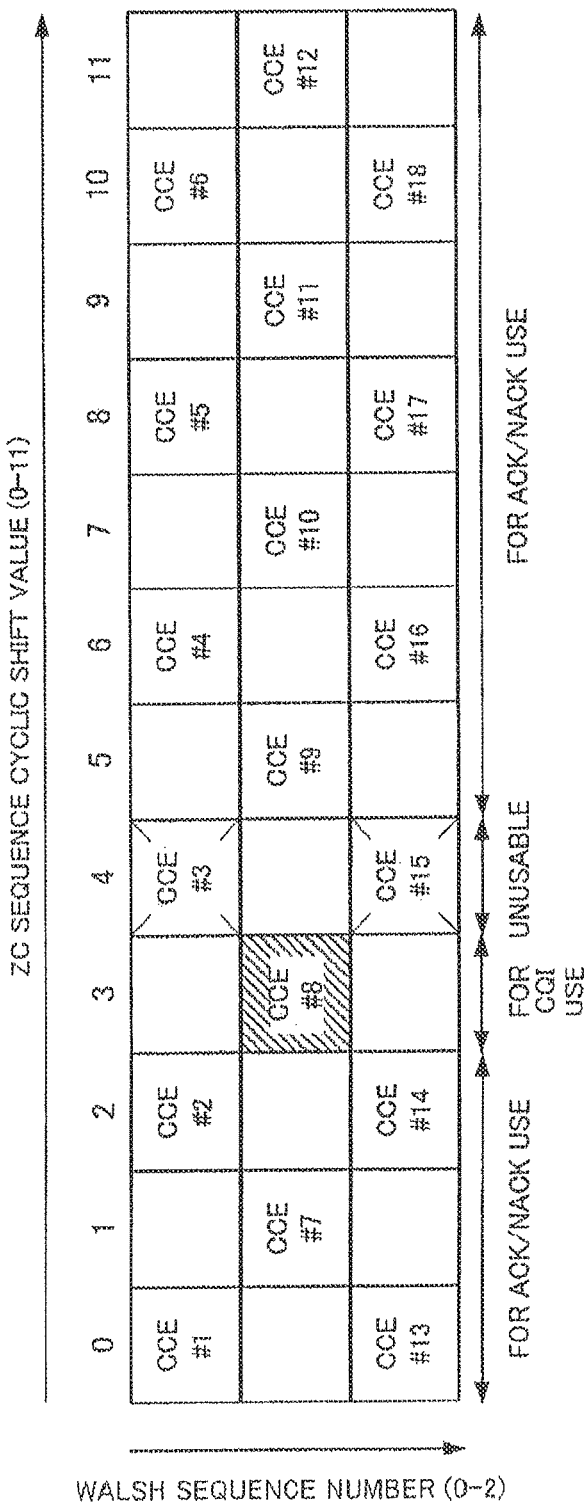
FIG. 10 is a drawing showing CCEs corresponding to PUCCHs used by mobile stations according to an embodiment 1.

FIG. 10 is a drawing showing CCEs corresponding to PUCCHs used by mobile stations. Here too, as in the above description, it is assumed that a CCE number and a PUCCH number defined by a ZC sequence cyclic shift value and Walsh sequence number are mapped on a one-to-one basis. That is to say, it is assumed that CCE #1 and PUCCH #1, CCE #2 and PUCCH #2, CCE #3 and PUCCH #3, and so on, are mutually mapped.

In FIG. 10, CCEs corresponding to PUCCHs for mobile station use are shown divided into CCEs used for ACK/NACK from a mobile station, CCEs used for a CQI from a mobile station, and unusable CCEs. A CCE for ACK/NACK use is a CCE corresponding to a PUCCH used for ACK/NACK transmission from a mobile station, while a CCE for CQI use is a CCE corresponding to a PUCCH used for CQI transmission from a mobile station. An unusable CCE is a CCE corresponding to a PUCCH that cannot be employed as a PUCCH for mobile station use.

In FIG. 10, CCEs #1, #2, #4, #5, #6, #7, #9, . . . , #14, #15, #17, and #18 are for ACK/NACK use, and the cyclic shift interval of these CCEs is set to 2, a level at which inter-code interference does not occur. CCE #8 is for CQI use, and CCEs #3 and #15 are unusable CCEs. The reason for making CCE #8 for CQI use and making CCEs #3 and #15 unusable is to maintain the cyclic shift interval between ZC sequences at a level of two or above at which inter-code interference does not occur. That is to say, by maintaining a cyclic shift interval of two or more between a CCE for CQI use and the nearest CCE for ACK/NACK use (here, CCE #9) following a CCE for CQI use in the time domain (the direction of the arrow indicating the horizontal axis in FIG. 10), inter-code interference between a CQI signal and ACK/NACK can be suppressed. Here, the ZC sequence cyclic shift interval between CCE #8 and CCEs #2 and #14 is 1—that is, less than 2. However, since inter-code interference is caused by a delayed wave, it is not necessary to consider the effect of interference by CCE #8 upon CCEs #2 and #14 located before CCE #8 in the time domain. Conversely, for the same reason—that is, the fact that inter-code interference is caused by a delayed wave—the effect of interference by CCE #2 and #14 upon CCE #8 cannot be ignored. However, since an ACK/NACK signal has greater influence on throughput than a CQI signal, provision has here been made for greater emphasis to be placed on ACK/NACK signal transmission quality than on CQI signal transmission quality. That is to say, a cyclic shift interval between a CCE for CQI use and a CCE for ACK/NACK use located after the CCE for CQI use is made larger than a cyclic shift interval between a CCE for CQI use and a CCE for ACK/NACK use located before the CCE for CQI use.

When CCEs corresponding to PUCCHs for ACK/NACK use or for CQI use such as shown in FIG. 10 are decided, control channel allocation section 102 forms an L1/L2CCH that makes these CCEs a minimum number in accordance with the number necessary for carrying control information.

Thus, according to this embodiment, a base station performs control channel allocation so as to maintain a ZC sequence cyclic shift interval of a PUCCH for CQI transmission with respect to a PUCCH for ACK/NACK transmission from a mobile station at a determined value or above, enabling inter-code interference between an ACK/NACK signal and a CQI signal that are code-multiplexed to be suppressed.

Figure 11:
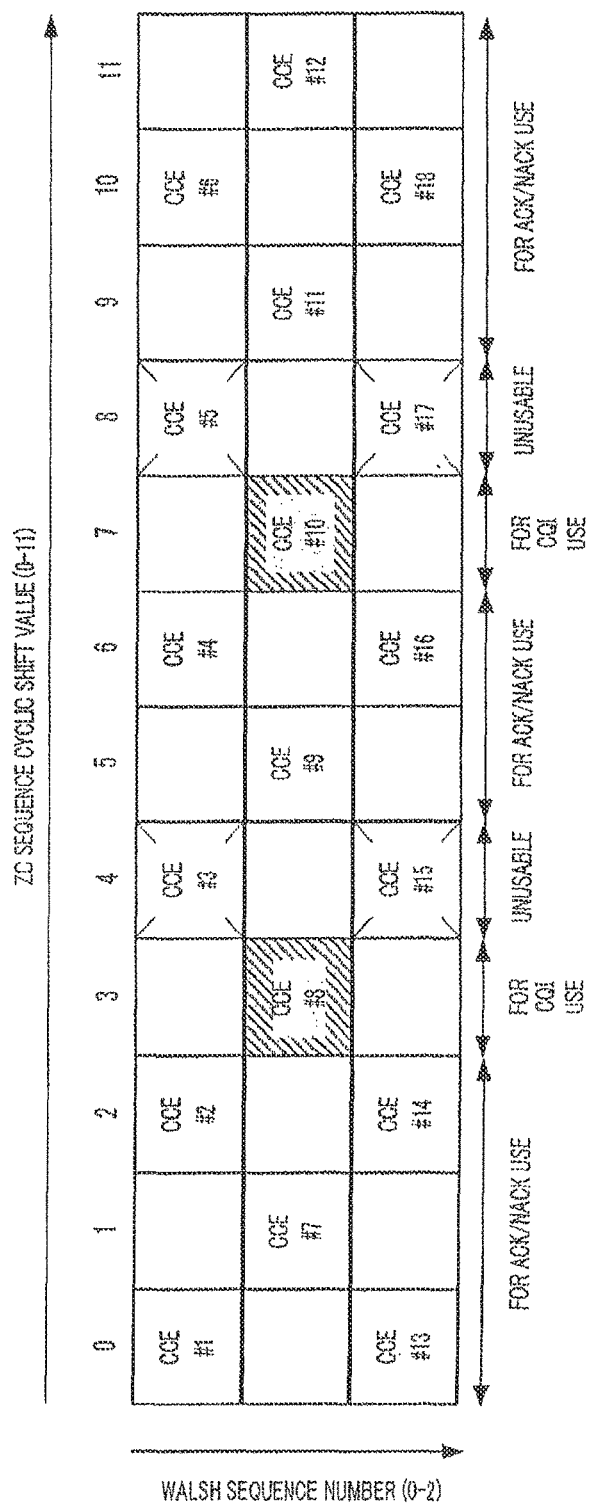
FIG. 11 is a drawing showing a variation of CCEs corresponding to PUCCHs used by mobile stations according to an embodiment.

In this embodiment, a case in which CCE #8 corresponding to one cyclic shift value of 3 is employed for CQI use has been described as an example, but the present disclosure is not limited to this, and CCEs corresponding to two or more cyclic shift values may also be employed for CQI use. For example, CCE #8 and CCE #10 corresponding to two cyclic shift values of 3 and 7 may be employed for CQI use as shown in FIG. 11. Here too, provision is made for the interval of CCE #8 and CCE #10 for CQI use with respect to following CCEs #9 and #11 for ACK/NACK use to be maintained at two or more.

Furthermore, a cyclic shift value with respect to a CCE for CQI use may be made common to all cells.

Embodiment 2

A base station and mobile station according to Embodiment 2 have the same kind of configurations as a base station (see base station 100 in FIG. 8) and mobile station (see mobile station 200 in FIG. 9) according to Embodiment 1, and differ in regard to part of the processing performed by the control channel allocation section (control channel allocation section 102 shown in FIG. 8).

Figure 12:
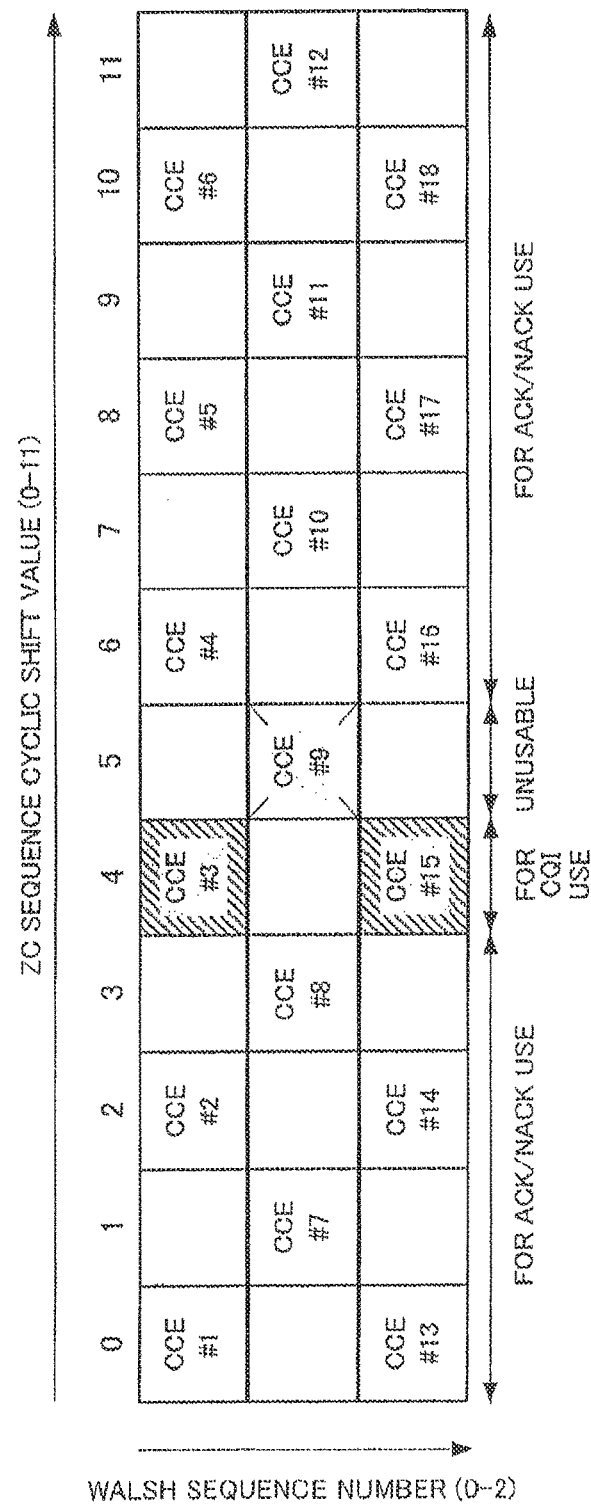
FIG. 12 is a drawing showing CCEs corresponding to PUCCHs used by mobile stations according to an embodiment.

FIG. 12 is a drawing showing CCEs corresponding to PUCCHs used by mobile stations, which are referenced by a control channel allocation section according to this embodiment. FIG. 12 is basically similar to FIG. 10, and therefore points of difference will be described here.

As shown in FIG. 12, a base station according to this embodiment employs adjacent CCEs #3 and #15 following a cyclic shift value including a smaller number of CCEs for ACK/NACK use among cyclic shift values including CCEs for ACK/NACK use as CCEs for CQI use. By this means, the number of CCEs for ACK/NACK use (here, CCE #8) with respect to CCEs #3 and #15 for CQI use becomes one, and interference of a CCE for ACK/NACK use with respect to CCEs for CQI use may be suppressed.

Thus, according to this embodiment, a base station performs control channel allocation so that an adjacent PUCCH becomes for CQI use after a cyclic shift value including a smaller number of PUCCHs for ACK/NACK use, while maintaining a ZC sequence cyclic shift interval of a PUCCH for CQI transmission with respect to a PUCCH for ACK/NACK transmission from a mobile station at a predetermined value or above, enabling inter-code interference between an ACK/NACK signal and a CQI signal that are code-multiplexed to be further suppressed.

Figure 13:
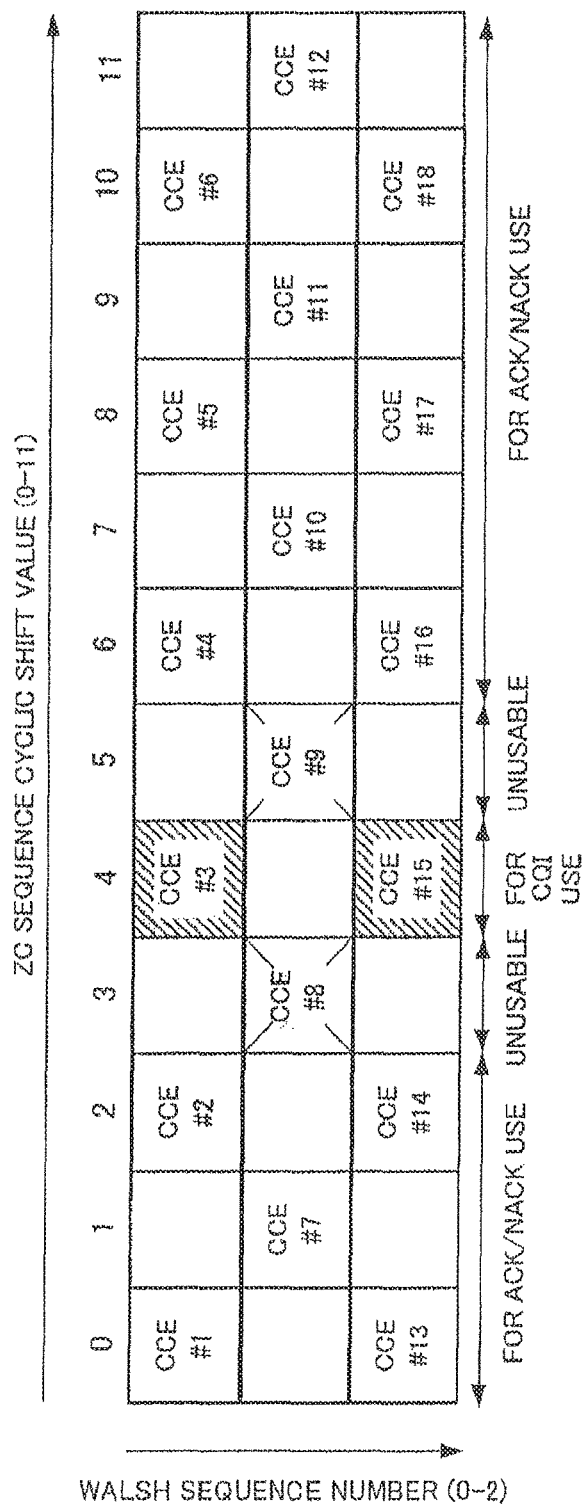
FIG. 13 is a drawing showing a variation of CCEs corresponding to PUCCHs used by mobile stations according to an embodiment.

In this embodiment, a case in which three CCEs are made CCEs that are for CQI use or unusable has been described as an example, but the present disclosure is not limited to this, and four CCEs may also be made CCEs for CQI use or unusable CCEs, as shown in FIG. 13. Furthermore, five or more CCEs may also be made CCEs for CQI use or unusable CCEs.

Embodiment 3

In Embodiment 3, control channel allocation will be described for a case in which a cyclic shift interval between PUCCHs used by mobile stations is 3 or more.

A base station and mobile station according to Embodiment 3 have the same kind of configurations as a base station (see base station 100 in FIG. 8) and mobile station (see mobile station 200 in FIG. 9) according to Embodiment 1, and differ in regard to part of the processing performed by the control channel allocation section (control channel allocation section 102 shown in FIG. 8).

Figure 14:
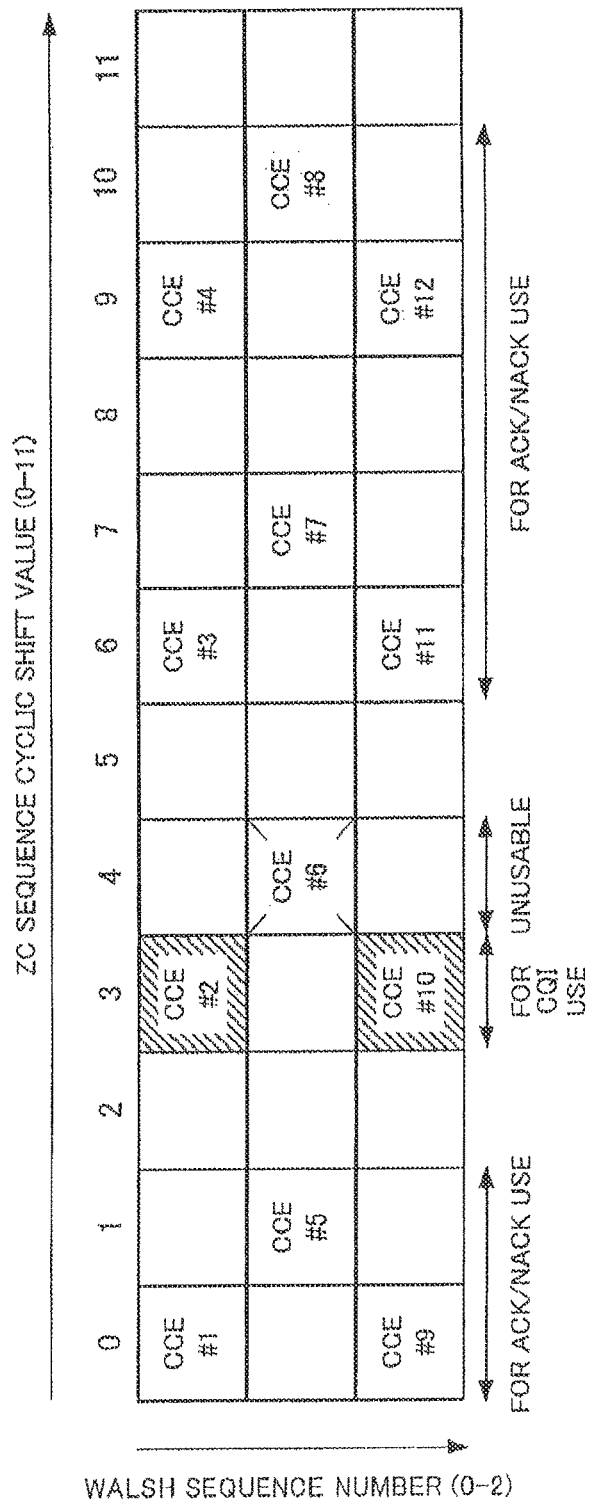
FIG. 14 is a drawing showing CCEs corresponding to PUCCHs used by mobile stations according to an embodiment 3.

FIG. 14 is a drawing showing CCEs corresponding to PUCCHs used by mobile stations, which are referenced by a control channel allocation section according to this embodiment. FIG. 14 is basically similar to FIG. 10, and therefore points of difference will be described here.

As shown in FIG. 14, a base station according to this embodiment employs CCEs #2 and #10 as CCEs for CQI use, and makes CCE #6 an unusable CCE, so that a cyclic shift interval between a CCE for ACK/NACK use and a CCE for CQI use becomes 3 or more.

Figure 15:
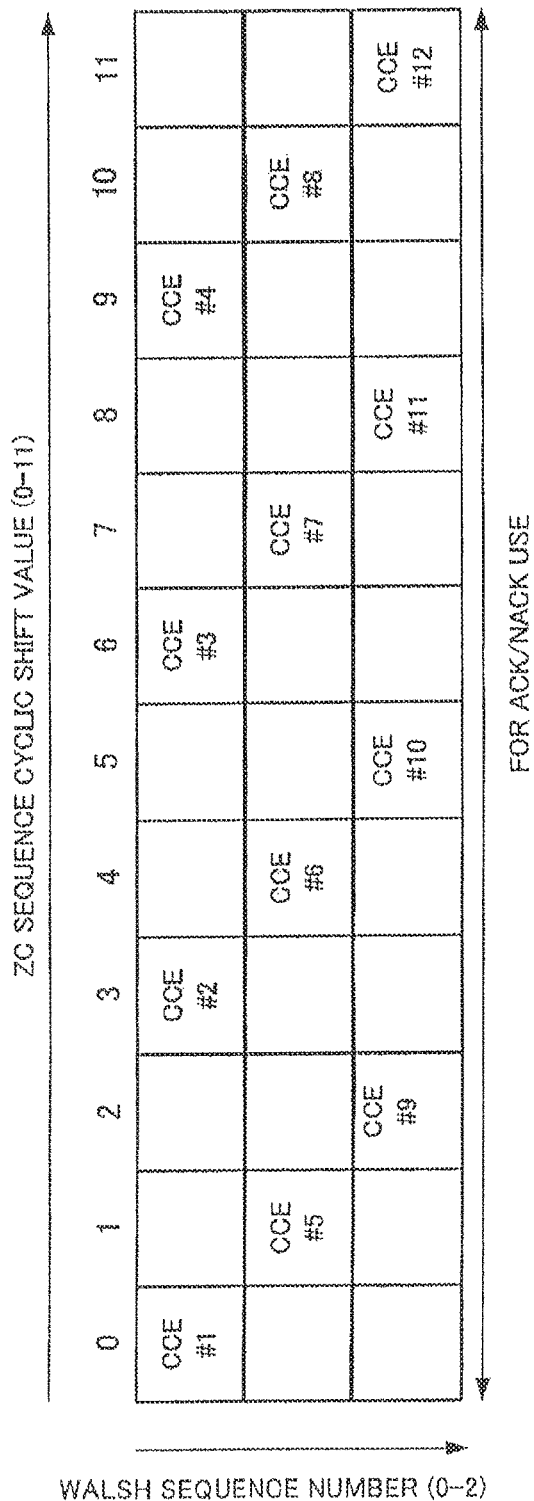
FIG. 15 is a drawing for explaining CCEs corresponding to PUCCHs used by mobile stations according to an embodiment.
Figure 16:
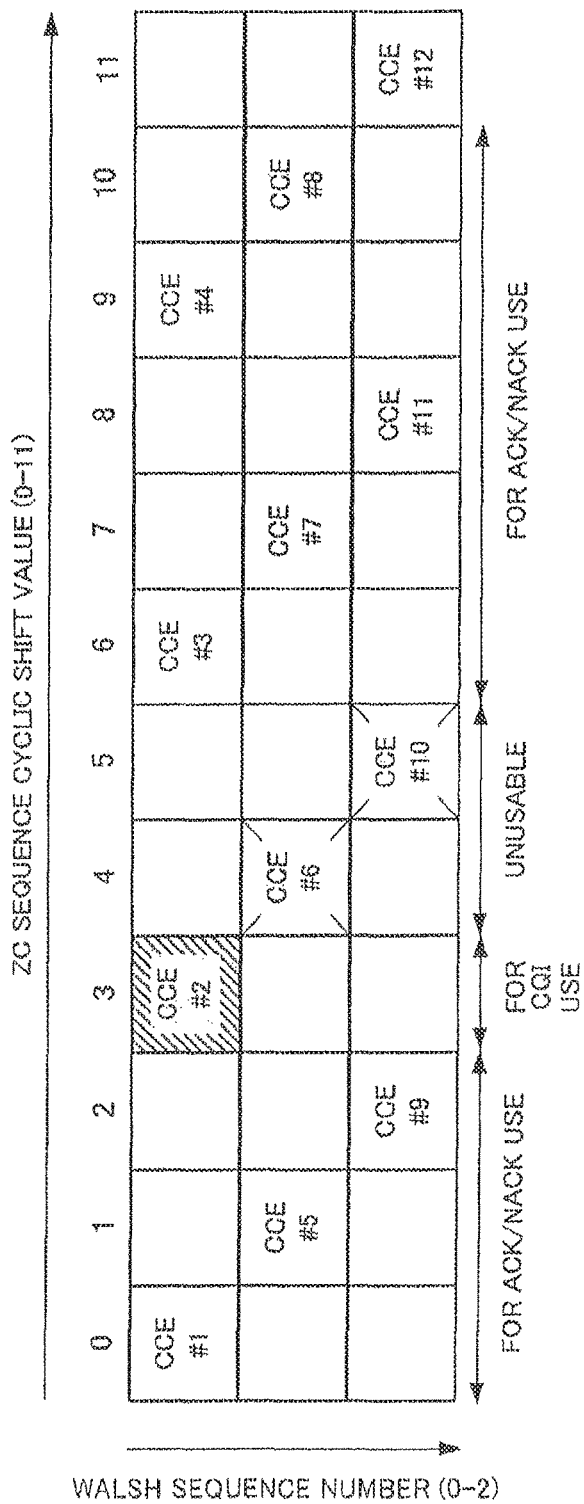
FIG. 16 is a drawing for explaining CCEs corresponding to PUCCHs used by mobile stations according to an embodiment.

The kind of CCE arrangement method shown in FIG. 14 is obtained as follows. Namely, if it is wished to employ some CCEs for ACK/NACK use such as shown in FIG. 15 as CCEs for CQI use, one possibility is to employ CCE #2 as a CCE for CQI use and to make CCEs #6 and #10 unusable CCEs as shown in FIG. 16, so that a cyclic shift interval between a CCE for ACK/NACK use and a CCE for CQI use becomes 3 or more. Now, if the ZC sequence cyclic shift value of CCEs #9 through #12 in FIG. 16 is reduced by 2 to suppress interference of CCE #9 for ACK/NACK use for CCE #2 for CQI use, FIG. 14 is obtained.

Thus, according to this embodiment, a base station can suppress inter-code interference between an ACK/NACK signal and a CQI signal that are code-multiplexed even if CCEs with a cyclic shift interval of three or more are allocated to a mobile station.

Figure 17:
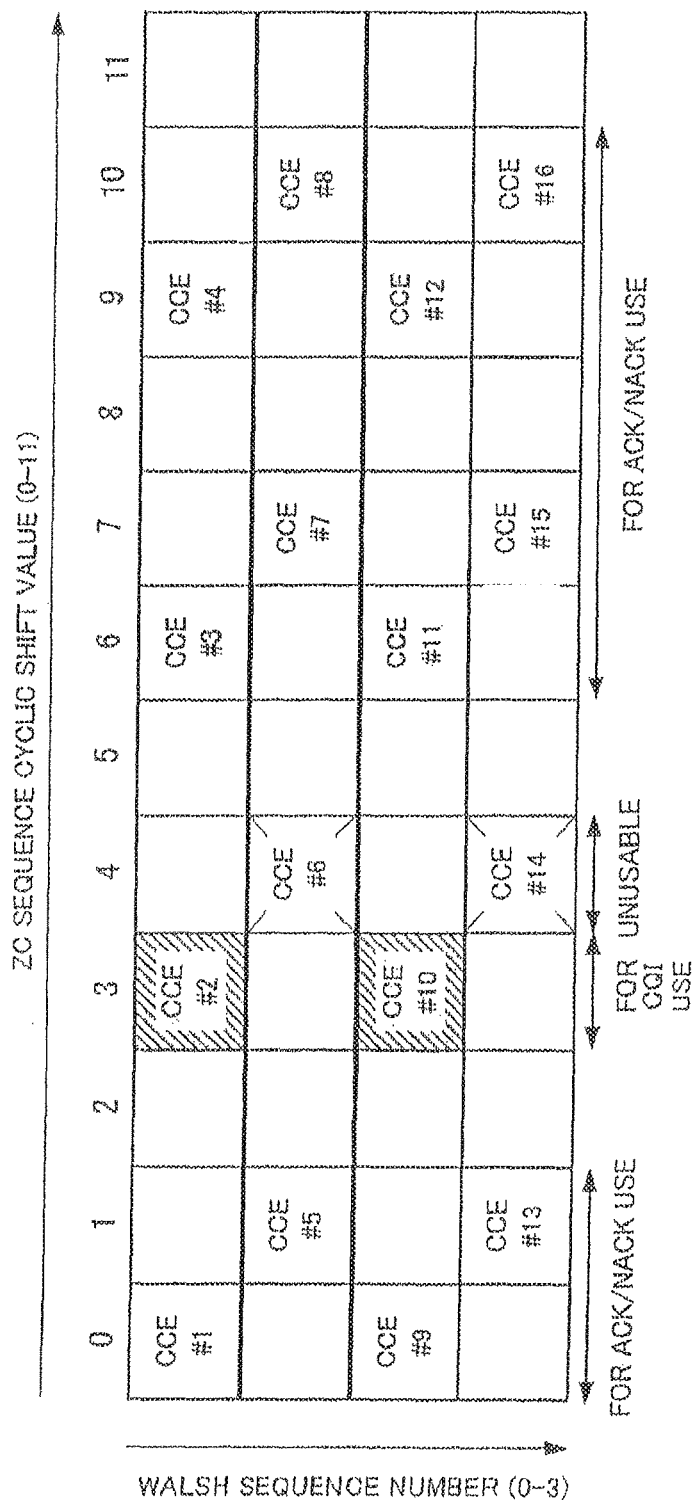
FIG. 17 is a drawing showing a variation of CCEs corresponding to PUCCHs used by mobile stations according to an embodiment.

In this embodiment, a case in which the Walsh length is 3 has been described as an example, but the present disclosure is not limited to this, and can also be applied to a case in which the Walsh length is four or more. FIG. 17 is a drawing showing CCEs corresponding to PUCCHs used by mobile stations when the Walsh length is four, and four Walsh codes are used. In FIG. 17, CCEs #2 and #10 are employed as CCEs for CQI use and CCEs #6 and #14 are made unusable CCEs, so that a cyclic shift interval between a CCE for ACK/NACK use and a CCE for CQI use becomes 3 or more.

This concludes a description of example embodiments.

A radio communication apparatus and response signal spreading method according to the present disclosure are not limited to the above-described embodiments, and various variations and modifications may be possible without departing from the scope of the present disclosure. For example, it is possible for embodiments to be implemented by being combined appropriately. For instance, a Walsh sequence with a sequence length of four or more may also be used in Embodiment 1 and Embodiment 2.

In the above embodiments, ACK/NACK signals and CQIs have been described as a plurality of response signals from a plurality of mobile stations as an example, but the present disclosure is not limited to this, and the present disclosure may also be applied to a case in which two kinds of response signals of different importance from a plurality of mobile stations, other than ACK/NACK signals and CQI signals—for example scheduling request signals and ACK/NACK signals—are code-multiplexed.

A mobile station may also be referred to as a UE, a base station apparatus as Node B, and a subcarrier as a tone. A CP may also be referred to as a guard interval (GI).

The error detection method is not limited to CRC.

Methods of performing transformation between the frequency domain and the time domain are not limited to IFFT and FFT.

In the above embodiments, cases have been described in which the present disclosure is applied to a mobile station. However, the present disclosure can also be applied to a fixed solid-state radio communication terminal apparatus, or a radio communication relay station apparatus that performs operations equivalent to a mobile station vis-a-vis a base station. That is to say, the present disclosure can be applied to all radio communication apparatuses.

In the above embodiments, cases have been described by way of example in which embodiments are configured as hardware, but it is also possible for embodiments to be implemented by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-211102, filed on Aug. 13, 2007, including the specification, drawings and abstract, is incorporated herein by reference in its entirety.

INDUSTRIAL APPLICABILITY

The present disclosure is suitable for use in a mobile communication system or the like.

What is claimed is:

1. A radio communication apparatus comprising:
    a processor configured to spread an ACKnowledgement/Negative ACKnowledgement (ACK/NACK) signal or a Channel Quality Indicator (CQI) signal with a sequence defined by one of a plurality of cyclic shift values; and
    a transmitter configured to transmit the ACK/NACK signal or the CQI signal;
    wherein the processor is configured, in each symbol that forms the ACK/NACK signal or the CQI signal, to use one of a first set of cyclic shift values, which form a portion of the plurality of the cyclic shift values and which are adjacent to each other, for the ACK/NACK signal, and to use one of a second set of cyclic shift values, which are not within the portion of the plurality of the cyclic shift values, for the CQI signal, and at least one cyclic shift value is not used for either the ACK/NACK signal or the CQI signal.

2. The radio communication apparatus according to claim 1, wherein the predefined interval is 2.

3. The radio communication apparatus according to claim 1, wherein the processor is further configured either:
    to map both a symbol that forms the ACK/NACK signal and a symbol that forms a CQI signal transmitted from another radio communication apparatus to a same symbol, or
    to map both a symbol that forms the CQI signal and a symbol that forms an ACK/NACK signal transmitted from another radio communication apparatus to a same symbol.

4. The radio communication apparatus according to claim 1, wherein the processor is further configured to map to a resource in a same frequency and in a same slot either:
    both the ACK/NACK signal and a CQI signal which is transmitted from another radio communication apparatus, or
    both the CQI signal and an ACK/NACK signal which is transmitted from another radio communication apparatus.

5. The radio communication apparatus according to claim 1, wherein the processor is further configured to code-multiplex either
    the ACK/NACK signal with a CQI signal transmitted from another radio communication apparatus, or
    the CQI signal with an ACK/NACK signal transmitted from another radio communication apparatus.

6. The radio communication apparatus according to claim 1, wherein the processor is configured to use a sequence having a length 12 as the sequence defined by a cyclic shift value.

7. The radio communication apparatus according to claim 1, wherein the processor is further configured to spread the ACK/NACK signal with one of a plurality of orthogonal sequences.

8. The radio communication apparatus according to claim 7, one of the plurality of orthogonal sequences has a length 4.

9. The radio communication apparatus according to claim 1, wherein the transmitter is configured to transmit the ACK/NACK signal or the CQI signal using a control channel, and the processor is configured to use the sequence defined by a cyclic shift value which is determined from the control channel.

10. The radio communication apparatus according to claim 1, wherein the communication apparatus is a mobile station.

11. A radio communication apparatus comprising:
    a processor configured to spread an ACKnowledgement/Negative ACKnowledgement (ACK/NACK) signal or a Channel Quality Indicator (CQI) signal with a sequence defined by one of a plurality of cyclic shift values; and
    a transmitter configured to transmit the ACK/NACK signal or the CQI signal;
    wherein the processor is configured, in each symbol that forms the ACK/NACK signal or the CQI signal, to use one of a plurality of adjacent cyclic shift values, which form a portion of the plurality of the cyclic shift values, for the ACK/NACK signal, and to use a cyclic shift value, which is separated by a predefined interval from the plurality of adjacent cyclic shift values, for the CQI signal, and the predefined interval is greater than a minimum interval between the plurality of adjacent cyclic shift values for the ACK/NACK signal.

12. The radio communication apparatus according to claim 11, wherein the predefined interval is 2.

13. The radio communication apparatus according to claim 11, wherein the processor is further configured either:
    to map both a symbol that forms the ACK/NACK signal and a symbol that forms a CQI signal transmitted from another radio communication apparatus to a same symbol, or
    to map both a symbol that forms the CQI signal and a symbol that forms an ACK/NACK signal transmitted from another radio communication apparatus to a same symbol.

14. The radio communication apparatus according to claim 11, wherein the processor is further configured to map to a resource in a same frequency and in a same slot either:
    both the ACK/NACK signal and a CQI signal which is transmitted from another radio communication apparatus, or
    both the CQI signal and an ACK/NACK signal which is transmitted from another radio communication apparatus.

15. The radio communication apparatus according to claim 11, wherein the processor is further configured to code-multiplex either
    the ACK/NACK signal with a CQI signal transmitted from another radio communication apparatus, or
    the CQI signal with an ACK/NACK signal transmitted from another radio communication apparatus.

16. The radio communication apparatus according to claim 11, wherein the processor is configured to use a sequence having a length 12 as the sequence defined by a cyclic shift value.

17. The radio communication apparatus according to claim 11, wherein the processor is further configured to spread the ACK/NACK signal with one of a plurality of orthogonal sequences.

18. The radio communication apparatus according to claim 17, one of the plurality of orthogonal sequences has a length 4.

19. The radio communication apparatus according to claim 11, wherein the transmitter is configured to transmit the ACK/NACK signal or the CQI signal using a control channel, and the processor is configured to use the sequence defined by a cyclic shift value which is determined from the control channel.

20. The radio communication apparatus according to claim 11, wherein the communication apparatus is a mobile station.

21. A radio communication apparatus comprising:
a processor configured to spread an ACKnowledement/Negative ACKnowledgement (ACK/NACK) signal or a Channel Quality Indicator (CQI-) signal with a sequence defined by one of a plurality of cyclic shift values; and
a transmitter configured to transmit the ACK/NACK signal or the CQI signal,
wherein the processor is configured, in each symbol that forms the ACK/NACK signal or the CQI signal, to use one of a first set of cyclic shift values, which form a portion of the plurality of the cyclic shift values and which are adjacent to each other, for the ACK/NACK signal, to use one of a second set of cyclic shift values, which are not within the portion of the plurality of the cyclic shift values, for the CQI signal, and at least one cyclic shift is not used for either the ACK/NACK signal or the CQI signal.

22. The radio communication apparatus according to claim 21, wherein the predefined interval is 2.

23. The radio communication apparatus according to claim 21, wherein the processor is further configured either:
to map both a symbol that forms the ACK/NACK signal and a symbol that forms a CQI signal transmitted from another radio communication apparatus to a same symbol, or
to map both a symbol that forms the CQI signal and a symbol that forms an ACK/NACK signal transmitted from another radio communication apparatus to a same symbol.

24. The radio communication apparatus according to claim 21, wherein the processor is further configured to map to a resource in a same frequency and in a same slot either:
both the ACK/NACK signal and a CQI signal which is transmitted from another radio communication apparatus, or
both the CQI signal and an ACK/NACK signal which is transmitted from another radio communication apparatus.

25. The radio communication apparatus according to claim 21, wherein
the processor is further configured to code-multiplex either the ACK/NACK signal with a CQI signal transmitted from another radio communication apparatus, or the CQI signal with an ACK/NACK signal transmitted from another radio communication apparatus.

26. The radio communication apparatus according to claim 21, wherein the processor is configured to use a sequence having a length 12 as the sequence defined by a cyclic shift value.

27. The radio communication apparatus according to claim 21, wherein the processor is further configured to spread the ACK/NACK signal with one of a plurality of orthogonal sequences.

28. The radio communication apparatus according to claim 27, one of the plurality of orthogonal sequences has a length 4.

29. The radio communication apparatus according to claim 21, wherein the transmitter is configured to transmit the ACK/NACK signal or the CQI signal using a control channel, and the processor is configured to use the sequence defined by a cyclic shift value which is determined from the control channel.

30. The radio communication apparatus according to claim 21, wherein the communication apparatus is a mobile station.

31. The radio communication apparatus according to claim 21, wherein the first cyclic shift values are cyclic shift values, which are separated by a predefined interval from the second cyclic shift values in the direction in which the cyclic shift values are cyclically increased.

32. The radio communication apparatus according to claim 21, wherein the predefined interval is greater than a minimum interval between the plurality of adjacent first cyclic shift values for the ACK/NACK signal.

33. A method for spreading a signal comprising the acts of:
(1) using a processor first to spread an ACKnowledgement/Negative ACKnowledgement (ACK/NACK) signal or a Channel Quality Indicator (CQI) signal with a sequence defined by one of a plurality of cyclic shift values; and
(2) using the processor to spread the ACK/NACK signal with one of a plurality of orthogonal sequences;
(3) wherein act (1) further comprises:
in each symbol that forms the ACK/NACK signal or the CQI signal, using for the ACK/NACK signal one of first set of cyclic shift values, which form a portion of the plurality of the cyclic shift values and which are adjacent to each other;
using for the CQI signal one of second set of cyclic shift values, which are not within the portion of the plurality of the cyclic shift values; and
not using at least one cyclic shift value for either the ACK/NACK signal or the CQI signal.

34. A method for spreading a signal comprising the acts of:
(1) using a processor first to spread a ACKnowledgement/Negative ACKnowledgement (ACK/NACK) signal or a Channel Quality Indicator (CQI) signal with a sequence defined by one of a plurality of cyclic shift values; and
(2) using the processor to spread the ACK/NACK signal with one of a plurality of orthogonal sequences;
(3) wherein act (1) further comprises:
in each symbol that forms the ACK/NACK signal or the CQI signal, using for the ACK/NACK signal one of a plurality of adjacent cyclic shift values, which form a portion of the plurality of the cyclic shift values;
using for the CQI signal a cyclic shift value, which is separated by a predefined interval from the plurality of adjacent cyclic shift values, the predefined interval being greater than a minimum interval between the plurality of adjacent cyclic shift values for the ACK/NACK signal.

35. A method for spreading a signal comprising the acts of:
(1) using a processor first to spread an ACKnowledgement/Negative ACKnowledgement (ACK/NACK) signal or a Channel Quality Indicator (CQI) signal with a sequence defined by one of a plurality of cyclic shift values; and
(2) using the processor to spread the ACK/NACK signal with one of a plurality of orthogonal sequences;
(3) wherein act (1) further comprises:
in each symbol that forms the ACK/NACK signal or the CQI signal, using for the ACK/NACK signal one of first cyclic shift values, which form a portion of the plurality of the cyclic shift values and which are adjacent to each other;
using for the CQI signal one of second cyclic shift values, which are not within the portion of the plurality of the cyclic shift values; and
not using for either the ACK/NACK signal or the CQI signal a cyclic shift value that is adjacent to the second cyclic shift values in the direction in which the cyclic shift values are cyclically increased is not used for either the ACK/NACK signal or the CQI signal.

36. A base station apparatus comprising:
a transmitter configured to transmit, to a mobile station, control information on a control channel element (CCE) and to transmit data to the mobile station; and
a receiver configured to receive an ACKnowledgement/Negative ACKnowledgement (ACK/NACK) signal or a Channel Quality Indicator (CQI) signal, which is spread with a sequence defined by one of a plurality of cyclic shift values and which is transmitted from the mobile station, the one of the plurality of cyclic shift values is associated with an index of the CCE;
a processor configured to despread the ACK/NACK signal and to demodulate the CQI signal; wherein the ACK/NACK signal or the CQI signal is spread, in each symbol that forms the ACK/NACK signal or the CQI signal, using one of a plurality of first cyclic shift values, which form a portion of the plurality of the cyclic shift values and which are adjacent to each other, for the ACK/NACK signal, and using one of second cyclic shift values, which are not within the portion of the plurality of the cyclic shift values, for the CQI signal, and a cyclic shift value between the first cyclic shift values and the second cyclic shift values is not used for either the ACK/NACK signal or the CQI signal.

37. A base station apparatus comprising:
a transmitter configured to transmit, to a mobile station, control information on a control channel element (CCE) and to transmit data to the mobile station; and
a receiver configured to receive an ACKnowledgement/Negative ACKnowledgement (ACK/NACK) signal or a Channel Quality Indicator (CQI) signal, which is spread with a sequence defined by one of a plurality of cyclic shift values and which is transmitted from the mobile station, the one of the plurality of cyclic shift values is associated with an index of the CCE;
a processor configured to despread the ACK/NACK signal and to demodulate the CQI signal;
wherein the ACK/NACK signal or the CQI signal is spread, in each symbol that forms the ACK/NACK signal or the CQI signal, using one of a plurality of a first set of cyclic shift values, which form a portion of the plurality of the cyclic shift values and which are adjacent to each other, for the ACK/NACK signal, and using one of a second set of cyclic shift values, which are not within the portion of the plurality of the cyclic shift values, for the CQI signal, and at least one cyclic shift value is not used for either the ACK/NACK signal or the CQI signal.

38. A base station apparatus comprising:
a transmitter configured to transmit, to a mobile station, control information on a control channel element (CCE) and to transmit data to the mobile station; and
a receiver configured to receive an ACKnowledgement/Negative ACKnowledgement (ACK/NACK) signal or a Channel Quality Indicator (CQI) signal, which is spread with a sequence defined by one of a plurality of cyclic shift values and which is transmitted from the mobile station, the one of the plurality of cyclic shift values is associated with an index of the CCE;
a processor configured to despread the ACK/NACK signal and to demodulate the CQI signal;
wherein the ACK/NACK signal or the CQI signal is sperad, in each symbol that forms the ACK/NACK signal or the CQI signal, using one of a plurality of adjacent cyclic shift values, which form a portion of the plurality of the cyclic shift values, for the ACK/NACK signal, and using a cyclic shift value, which is separated by a predefined interval from the plurality of adjacent cyclic shift values, for the CQI signal, and the predefined interval is greater than a minimum interval between the plurality of adjacent cyclic shift values for the ACK/NACK signal.

* * * * *

UNITED STATES PATENT AND TRADEMARK OFFICE
CERTIFICATE OF CORRECTION

PATENT NO. : 9,660,750 B2
APPLICATION NO. : 14/595650
DATED : May 23, 2017
INVENTOR(S) : Futagi et al.

Page 1 of 1

It is certified that error appears in the above-identified patent and that said Letters Patent is hereby corrected as shown below:

In the Specification

Column 2, Line 23, change "(12.times.4)" to --(12×4)--

In the Claims

Claim 21, Column 15, Line 8, change "ACKnowledement" to --ACKnowledgement--

Claim 21, Column 15, Line 10, change "(CQI-)" to --(CQI)--

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*